US012723969B2

(12) United States Patent
Yoshimi et al.

(10) Patent No.: US 12,723,969 B2
(45) Date of Patent: Sep. 1, 2026

(54) METHOD FOR PREDICTING AMOUNT OF CORROSION IN STEEL, SYSTEM FOR PREDICTING AMOUNT OF CORROSION IN STEEL, PROGRAM FOR PREDICTING AMOUNT OF CORROSION IN STEEL AND METHOD FOR PROPOSING STEEL

(71) Applicant: NIPPON STEEL Stainless Steel Corporation, Tokyo (JP)

(72) Inventors: Toshihiko Yoshimi, Tokyo (JP); Nobuhiko Hiraide, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 424 days.

(21) Appl. No.: 18/284,777

(22) PCT Filed: Mar. 23, 2022

(86) PCT No.: PCT/JP2022/013419

§ 371 (c)(1),
(2) Date: Sep. 28, 2023

(87) PCT Pub. No.: WO2022/210151

PCT Pub. Date: Oct. 6, 2022

(65) Prior Publication Data

US 2024/0151633 A1 May 9, 2024

(30) Foreign Application Priority Data

Mar. 31, 2021 (JP) ................................ 2021-059457

(51) Int. Cl.
*G01N 17/00* (2006.01)
*G06Q 30/015* (2023.01)

(52) U.S. Cl.
CPC ......... *G01N 17/006* (2013.01); *G06Q 30/015* (2023.01)

(58) Field of Classification Search
CPC .. G01N 17/006; G01N 33/2045; G06F 30/20; G06F 2119/08
See application file for complete search history.

(56) References Cited

U.S. PATENT DOCUMENTS

2004/0176934 A1* 9/2004 Kihira .................. G01N 17/006 324/700
2014/0283619 A1* 9/2014 Sugano .................... G01N 3/32 73/799

(Continued)

FOREIGN PATENT DOCUMENTS

GB 2437320 A * 10/2007 ............. G06F 17/00
JP 2000-131363 A 5/2000

(Continued)

OTHER PUBLICATIONS

International Search Report for PCT/JP2022/013419 (PCT/ISA/210) mailed on May 17, 2022.

(Continued)

*Primary Examiner* — Ricky Go
(74) *Attorney, Agent, or Firm* — Birch, Stewart, Kolasch & Birch, LLP

(57) ABSTRACT

There is provided a method for predicting the amount of corrosion in a steel including a step in which, based on a weather observation value $W_M$ at a scheduled use point M of the steel, a corrosion index $Q(t_{Mi}, W_M)$ is obtained for each past observation time $t_{Mi}$, extremal value statistical analysis is performed on time-series data of the corrosion index $Q(t_{Mi}, W_M)$ between observation times $t_{M1}$ to $t_{Mn}$, and a maximal value $Q_{max}(t_{Fi})$ of the corrosion index within future evaluation periods $t_{F1}$ to $t_{Fn}$ is estimated, and a corrosion amount estimation step in which a relational expression between a measured corrosion amount obtained in a corrosion test at a test point Z and the maximum value of a corrosion index $Q(t_{Zi}, W_Z)$ obtained for each observation (Continued)

EXTREMAL VALUE ESTIMATION UNIT

CORROSION AMOUNT ESTIMATION UNIT time $t_{Zi}$ during a test period of the corrosion test based on a weather observation value $W_Z$ at the test point Z is obtained in advance, the maximal value $Q_{max}(t_{Fi})$ of the corrosion index estimated above is introduced into the relational expression, and an estimated value of the amount of corrosion in the steel during the estimated period is obtained.

21 Claims, 4 Drawing Sheets

(56) References Cited

U.S. PATENT DOCUMENTS

2016/0290974 A1 10/2016 Coleman et al.
2021/0072144 A1* 3/2021 Omoda ................ G01N 17/006
2021/0325295 A1* 10/2021 Asada .................... G01N 27/26
2022/0221393 A1 7/2022 Mineta et al.

FOREIGN PATENT DOCUMENTS

JP 2018-25497 A 2/2018
WO WO 03/006957 A1 1/2003
WO WO 2020/234921 A1 11/2020

OTHER PUBLICATIONS

Ishikawa et al., "Using polar region statistics to predict localized corrosion damage", Bulletin of the Japan Institute of Metals, Jan. 1, 1982, vol. 21, No. 3, pp. 133-140, retrieved on Apr. 22, 2022.

* cited by examiner

METHOD FOR PREDICTING AMOUNT OF CORROSION IN STEEL, SYSTEM FOR PREDICTING AMOUNT OF CORROSION IN STEEL, PROGRAM FOR PREDICTING AMOUNT OF CORROSION IN STEEL AND METHOD FOR PROPOSING STEEL

TECHNICAL FIELD

The present invention relates to a method for predicting the amount of corrosion in a steel, a system for predicting the amount of corrosion in a steel, a program for predicting the amount of corrosion in a steel and a method for proposing a steel.

Priority is claimed on Japanese Patent Application No. 2021-59457, filed Mar. 31, 2021, the content of which is incorporated herein by reference.

BACKGROUND ART

Construction steels are used as materials for building exterior walls, columns, beams and the like. Consumers who have considered or decided to purchase construction steels have a desire to predict the amount of corrosion in the future when construction steels are used in an outdoor environment for a long period of time.

Patent Document 1 describes a method for predicting corrosion of weather resistant steel including a process of calculating, by an electronic computer, a predicted amount of corrosion in weather resistant steel, using extrinsic corrosion information including the annual wet time, the annual average wind speed, the annual average temperature, the amount of airborne salt and the amount of sulfur oxides at a use scheduled position at which weather resistant steel is scheduled to be used, and intrinsic corrosion information on weather resistant steel components.

Incidentally, corrosion of steels may be greatly affected by sudden weather changes. For example, at a point near the coast, if a phenomenon in which the wind speed significantly increases compared to general weather conditions occurs with an approaching typhoon, or a phenomenon in which the wind speed significantly increases in a short time due to the influence of barometric pressure distribution occurs, a large amount of a salt adheres to building steels in a comparative short period. Thereby, the amount of corrosion in the steel may significantly increase.

In Patent Document 1, when a predicted amount of corrosion in the future is obtained, prediction is performed based on annual average values such as the annual average wind speed and the annual average temperature. However, in prediction based on the annual average values, due to the structure of data, short-period sudden weather changes that can impart a large influence on corrosion of steels as described above are not considered. Therefore, there is room for improvement in prediction accuracy of the corrosion amount compared to conventional prediction methods.

PRIOR ART DOCUMENT

Patent Document

[Patent Document 1]
PCT International Publication No. WO2003/006957

SUMMARY OF INVENTION

Problems to be Solved by the Invention

An object of the present invention is to provide a method for predicting the amount of corrosion in a steel, a system for predicting the amount of corrosion in a steel and a program for predicting the amount of corrosion in a steel through which it is possible to improve the accuracy of predicting the amount of corrosion in a steel. In addition, an object of the present invention is to provide a method for proposing a steel using the amount of corrosion in a steel predicted by the method for predicting the amount of corrosion in a steel.

Means for Solving the Problem

In order to achieve the above objects, the present invention provides the following configurations.

[1] A method for predicting the amount of corrosion in a steel using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the method including:

an extremal value estimation step in which, based on the weather observation value $W_M$ at which the observation point X is a scheduled use point M of the steel, a corrosion index $Q(t_{Mi}, W_M)$ of the steel is obtained for each past observation time $t_{Mi}$, extremal value statistical analysis is performed on time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated; and a corrosion amount estimation step in which a relational expression between a measured corrosion amount obtained in a corrosion test for the steel at a test point Z and the maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z is obtained in advance, the maximal value $Q_{max}(t_{Fi})$ of the corrosion index estimated in the extremal value estimation step is introduced into the relational expression, and an estimated value of the amount of corrosion in the steel during the evaluation periods is obtained.

Here, the above relational expression may be a relational expression between the measured corrosion amount obtained in the corrosion test for the steel and the logarithm of the maximum value of the corrosion index $Q(t_{Zi}, W_Z)$ of the steel.

[2] The method for predicting the amount of corrosion in a steel according to [1], in which the extremal value estimation step and the corrosion amount estimation step each include a calculation step of obtaining the corrosion index $Q(t_{Xi}, W_X)$, and in which the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3A) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \quad (2)$$

$$Q(t_{Xi},W_X)=Q_2(t_{Xi},W_X)\cdot p(t_{Xi}) \quad (3A)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), c $(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[3] The method for predicting the amount of corrosion in a steel according to [1], in which the extremal value estimation step and the corrosion amount estimation step each include a calculation step of obtaining the corrosion index $Q(t_{Xi}, W_X)$, and in which the calculation step includes:

a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3B) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \quad (2)$$

$$Q(t_{Xi},W_X)=10^{0.04Tb}\cdot Q_2(t_{Xi},W_X)\cdot p(t_{Xi}) \quad (3B)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[4] The method for predicting the amount of corrosion in a steel according to [1], in which the extremal value estimation step and the corrosion amount estimation step each include a calculation step of obtaining the corrosion index $Q(t_{Xi}, W_X)$, and in which the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3C) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \quad (2)$$

$$Q(t_{Xi},W_X)=10^{0.04Tc}\cdot Q_2(t_{Xi},W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi}$-to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

[5] The method for predicting the amount of corrosion in a steel according to any one of [1] to [4], in which the steel is a steel made of stainless steel.

[6] A system for predicting the amount of corrosion in a steel by an electronic computer using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the system including:

an extremal value estimation unit that, based on the weather observation value $W_M$ at which the observation point X is a scheduled use point M of the steel, obtains a corrosion index $Q(t_{Mi}, W_M)$ of the steel for each past observation time $t_{Mi}$, performs extremal value statistical analysis on time-series data of the corrosion index $Q(t_{Mi}, W_M)$ between observation times $t_{M1}$ to $t_{Mn}$, and thus estimates a maximal value $Q_{max}(t_{Fi})$ of the corrosion index within future evaluation periods $t_{F1}$ to $t_{Fn}$; and a corrosion amount estimation unit that obtains a relational expression between a measured corrosion amount obtained in a corrosion test for the steel at a test point Z and the maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z in advance, introduces the maximal value $Q_{max}(t_{Fi})$ of the corrosion index estimated by the extremal value estimation unit into the relational expression, and obtains an estimated value of the amount of corrosion in the steel during the evaluation periods.

Here, the above relational expression may be a relational expression between the measured corrosion amount obtained in the corrosion test for the steel and the logarithm of the maximum value of the corrosion index $Q(t_{Zi}, W_Z)$ of the steel.

[7] The system for predicting the amount of corrosion in a steel according to [6], in which the extremal value estimation unit and the corrosion amount estimation unit each include a calculation unit for obtaining the corrosion index $Q(t_{Xi}, W_X)$, and in which the calculation unit includes:

a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3A) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=Q_2(t_{Xi}, W_X)\cdot p(t_{Xi}) \quad (3A)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[8] The system for predicting the amount of corrosion in a steel according to [6], in which the extremal value estimation unit and the corrosion amount estimation unit each include a calculation unit for obtaining the corrosion index $Q(t_{Xi}, W_X)$, and in which the calculation unit includes:

a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3B) for each observation time $t_{Xi}$:

$$Q_1(t_{Xi}, W_X)=(d+1)^{-0.6}\{u(t_{Xi})-\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=10^{0.04Tb}\cdot Q_2(t_{Xi}, W_X)\cdot p(t_{Xi}) \quad (3B)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[9] The system for predicting the amount of corrosion in a steel according to [6], in which the extremal value estimation unit and the corrosion amount estimation unit each include a calculation unit for obtaining the corrosion index $Q(t_{Xi}, W_X)$, and in which the calculation unit includes:

a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3C) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \quad (2)$$

$$Q(t_{Xi},W_X)=10^{0.04Tc}\cdot Q_2(t_{Xi},W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

[10] The system for predicting the amount of corrosion in a steel according to any one of [6] to [9], in which the steel is a steel made of stainless steel.

[11] A program for predicting the amount of corrosion in a steel used in an electronic computer, using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the program including:

an extremal value estimation step in which, based on the weather observation value $W_M$ at which the observation point X is a scheduled use point M of the steel, a corrosion index $Q(t_{Mi}, W_M)$ of the steel is obtained for each past observation time $t_{Mi}$, extremal value statistical analysis is performed on time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated; and a corrosion amount estimation step in which a relational expression between a measured corrosion amount obtained in a corrosion test for the steel at a test point Z and the maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z is obtained in advance, the maximal value $Q_{max}(t_{Fi})$ of the corrosion index estimated in the extremal value estimation step is introduced into the relational expression, and an estimated value of the amount of corrosion in the steel during the evaluation periods is obtained.

Here, the above relational expression may be a relational expression between the measured corrosion amount obtained in the corrosion test for the steel and the logarithm of the maximum value of the corrosion index $Q(t_{Zi}, W_Z)$ of the steel.

[12] The program for predicting the amount of corrosion in a steel according to [11], in which the extremal value estimation step and the corrosion amount estimation step each include a calculation step of obtaining the corrosion index $Q(t_{Xi}, W_X)$, and in which the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3A) for each observation time $t_{Xi}$:

$$Q(t_{Xi},W_X)=(d+1)^{-0.6}\{u(t_{Xi})-\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{XiS-1})\}\cdot c(t_{Xi}) \quad (2)$$

$$Q(t_{Xi},W_X)=Q_2(t_{Xi},W_X)\cdot p(t_{Xi}) \quad (3A)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[13] The program for predicting the amount of corrosion in a steel according to [11], in which the extremal value estimation step and the corrosion amount estimation step each include a calculation step of obtaining the corrosion index $Q(t_{Xi}, W_X)$, and in which the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3B) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{XiS-1})\}\cdot c(t_{Xi}) \quad (2)$$

$$Q(t_{Xi},W_X)=10^{0.04Tb}\cdot Q_2(t_{Xi},W_X)\cdot p(t_{Xi}) \quad (3B)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

[14] The program for predicting the amount of corrosion in a steel according to [11], in which the extremal value estimation step and the corrosion amount estimation step each include a calculation step of obtaining the corrosion index $Q(t_{Xi}, W_X)$, and in which the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3C) for each observation time $t_{Xi}$:

$$Q(t_{Xi},W_X)=(d+1)^{-0.6}\{u(t_{Xi})-\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{XiS-1})\}\cdot c(t_{Xi}) \quad (2)$$

$$Q(t_{Xi},W_X)=10^{0.04Tc}\cdot Q_2(t_{Xi},W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

[15] The program for predicting the amount of corrosion in a steel according to any one of [11] to [14], in which the steel is a steel made of stainless steel.

[16] A method for proposing a steel including:

a prediction process in which the amount of corrosion in the steel in the future at the scheduled use point M is predicted by the method for predicting the amount of corrosion in a steel according to any one of [1] to [5]; and a process in which a salesperson presents an image of the surface of the steel corresponding to a predicted value of the amount of corrosion obtained in the prediction process or a predicted value of the amount of corrosion to a customer.

[17] A method for proposing a steel including:

a prediction process in which the amount of corrosion in the steel in the future at the scheduled use point M is predicted for each of a plurality of types of steels by the method for predicting the amount of corrosion in a steel according to any one of [1] to [5]; and a process in which a salesperson presents an image of the surface of the steel corresponding to a predicted value of the amount of corrosion for each steel obtained in the prediction process or a predicted value of the amount of corrosion to a customer.

[18] The method for proposing a steel according to [16] or [18], in which the predicted value of the amount of corrosion is a rating number to at least one decimal place.

[19] The method for proposing a steel according to [16] or [18], in which the image of the surface of the steel corresponding to the predicted value of the amount of corrosion is an image corresponding to a rating number to at least one decimal place.

Effects of Invention

In the method for predicting the amount of corrosion in a steel, the system for predicting the amount of corrosion in a steel and the program for predicting the amount of corrosion in a steel according to the present invention, extremal value statistical analysis is performed on time-series data of the corrosion index $Q_M(t_{Mi}, W_M)$ for each past observation time $t_{Mi}$ at the scheduled use point M of the steel, and thus the maximal value $Q_{max}(t_{Fi})$ of the corrosion index within future evaluation periods $t_{F1}$ to $t_{Fn}$ is estimated. Next, the maximal value $Q_{max}(t_{Fi})$ of the corrosion index is introduced into the relational expression between the measured corrosion amount of the steel and the corrosion index $Q(t_{Zi}, W_Z)$ of the steel obtained in advance from the results of the corrosion test. In the present invention, since the amount of future corrosion of the steel is estimated in this manner, it is possible to improve the prediction accuracy of the corrosion amount compared to a conventional method for predicting the amount of corrosion based on the annual average value.

In addition, in the method for predicting the amount of corrosion in a steel, the system for predicting the amount of corrosion in a steel and the program for predicting the amount of corrosion in a steel according to the present invention, based on the results of the corrosion test for the steel at the test point Z, the future corrosion amount of the steel at the scheduled use point M is estimated. In the present invention, the correspondence relationship between the measured corrosion amount of the steel and the corrosion index $Q(t_{Zi}, W_Z)$ at the test point Z and time-series data of the corrosion index $Q(t_{Mi}, W_M)$ obtained from the weather observation value $W_M$ at the scheduled use point M may be obtained. Thereby, the present invention has excellent versatility.

In addition, according to the method for predicting the amount of corrosion in a steel, the system for predicting the amount of corrosion in a steel and the program for predicting the amount of corrosion in a steel of the present invention, a primary corrosion index $Q_1(t_{Xi}, W_X)$ and a secondary corrosion index $Q_2(t_{Xi}, W_X)$ are sequentially obtained, and additionally, a corrosion index $Q(t_{Xi}, W_X)$ is obtained from the secondary corrosion index $Q_2(t_{Xi}, W_X)$. Here, the primary corrosion index $Q_1(t_{Xi}, W_X)$ is an index of the amount of a salt adhered to the steel, and calculated based on the wind speed $u(t_{Xi})$ and the wind direction θs, $\theta w(t_{Xi})$. In addition, the secondary corrosion index $Q_2(t_{Xi}, W_X)$ is calculated by adding the primary corrosion index $Q_1(t_{Xi}, W_X)$ at the observation time $t_{Xi}$ to the secondary corrosion index $Q_2(t_{Xi-1}, W_X)$ at the observation time $t_{Xi-1}$ which is an observation time immediately before the observation time $t_{Xi}$, additionally introducing the content of a salt, which is a main cause of corrosion, washed away by rain, as a corrosion extinction coefficient $c(t_{Xi})$, and introducing an increase in adhesion of a salt at nighttime when condensed water is likely to be generated on the surface of the steel as a corrosion accumulation coefficient $s(t_{Xi})$. Then, the corrosion index $Q(t_{Xi}, W_X)$ is calculated by quantifying a phenomenon in which corrosion progresses due to condensed water containing a salt adhered at nighttime that is dried by sunlight during the daytime with a corrosion expression coefficient $p(t_{Xi})$, and multiplying the corrosion expression coefficient $p(t_{Xi})$ by the secondary corrosion index $Q_2(t_{Xi}, W_X)$. Thereby, it is possible to obtain the corrosion index $Q(t_{Xi}, W_X)$ that reflects weather conditions that influence the amount of a salt adhered to the steel, and by using this index, it is possible to improve the prediction accuracy of the corrosion amount.

In the method for proposing a steel according to the present invention, according to the method for predicting the amount of corrosion in a steel of the present invention, the amount of corrosion in the steel in the future at the scheduled use point M is predicted, and a salesperson presents the obtained predicted value of the amount of corrosion to a customer. Thereby, the present invention can meet the customer's demand to know the predicted value of the future corrosion amount when the steel is used in an outdoor environment for a long period of time. In addition, since the present invention can provide a highly accurate predicted value of the amount of corrosion, it is possible to recommend an appropriate steel to the customer.

In addition, according to the method for proposing a steel of the present invention, by the method for predicting the amount of corrosion in a steel according to the present invention, the amount of corrosion in the steel in the future at the scheduled use point M is predicted for each of a plurality of types of steels, and a salesperson presents the obtained predicted value of the amount of corrosion for each steel to a customer. Thereby, the present invention can meet the customer's demand to know the predicted value of the future corrosion amount when the steel is used in an outdoor environment for a long period of time. In addition, since the present invention can provide a highly accurate predicted value of the amount of corrosion for each steel type, it is possible to select an appropriate steel and recommend it to the customer.

DESCRIPTION OF EMBODIMENTS

Figure 1:
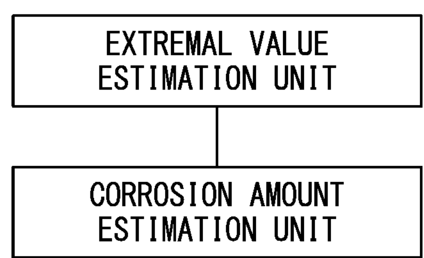
FIG. 1 is a schematic view illustrating a system for predicting the amount of corrosion in a steel according to an embodiment of the present invention.

Steels left in an outdoor environment gradually corrode when, for example, corrosion-accelerating substances such as a salt adhere to the surface of steels due to the influence of wind or the like. General constructions such as buildings and civil engineering structures such as bridges and towers require long-period durability in an outdoor environment. Therefore, it is preferable for the progress of the future corrosion amount of steels used in these buildings and structures to be possible to predict. As a conventional technique, a method for predicting the amount of corrosion based on the annual wet time, the annual average wind speed, the annual average temperature and the like is known.

However, corrosion of steels may rapidly progress due to adhesion of a salt, and may be greatly affected by sudden weather changes. Therefore, in conventional prediction based on annual average values, due to the structure of data, short-period sudden weather changes that can impart a large influence on corrosion of steels are not considered. Therefore, there is room for improvement in prediction accuracy of the corrosion amount compared to conventional prediction methods.

That is, the amount of corrosion in the steel left in an outdoor environment is influenced by the amount of salt adhered to steels. Since the salt is mainly moved by wind blowing in from the coast and adheres to steels, it is conventionally thought that it is possible to predict the amount of corrosion to some extent from the monthly average values and annual average values of the wind speed and the change in the wind direction. However, when corrosion tests in which steels are left in an outdoor environment have actually been performed, there have been cases in which the amount of corrosion could not be explained simply by considering the monthly average values and annual average values of the wind speed and the wind direction.

In addition, steels made of stainless steel may corrode more rapidly due to adhesion of a salt than common steels. In addition, since stainless steel has excellent design properties, it is often used for exterior walls of buildings without being painted, and is more susceptible to the salt than common steel.

Therefore, it is desired to develop a method through which it is possible to accurately predict the amount of corrosion in the steel.

Thus, as a result of extensive examination by the inventors, as weather conditions in which corrosion tends to progress when steels are left outdoors, weather conditions in which no rain occurs from nighttime to daytime were found. That is, when condensed water adheres to the surface of the steel as the temperature at nighttime decreases, the salt moved by the sea wind blowing in from the coast dissolves in the condensed water. Thus, it was found that, when condensed water containing the salt evaporates due to sunlight during the daytime, the salt concentrates on the surface of the steel, and as a result, corrosion is likely to occur. In particular, if a strong wind blows in from the nearest coast due to approaching of a typhoon, hurricane, cyclone or the like or the influence of the barometric pressure distribution, it was found that a large amount of a salt tends to adhere to the surface of the steel. In addition, it was found that, unless it rains, accumulation of a salt on the surface of the steel at nighttime continues, and thus corrosion is more likely to occur. On the other hand, it was found that, when it rains, since the salt is washed away from the surface of the steel due to rainwater, corrosion is less likely to progress. Then, in consideration of such weather conditions, a method in which it is possible to estimate the amount of corrosion in the steel in the future with high accuracy using the corrosion index $Q(t_{Xi}, W_X)$ obtained from the weather observation value $W_X$ including the wind speed, the wind direction and the amount of rain for each observation time $t_{Xi}$ is found.

Here, in the present invention, the presence of sunlight is distinguished by whether the observation time $t_{Xi}$ is daytime or nighttime. The weather observation value $W_X$ may include the sunlight time in order to determine whether there is sunlight. In addition, in order to determine whether there is sunlight, the sunrise time and the sunset time are calculated from the longitude, the latitude and the altitude at the observation point X, and it may be determined whether the observation time $t_{Xi}$ is included in the daytime or the nighttime. Details will be described below.

In addition, in order to accurately predict the amount of corrosion in the steel, it is necessary to refer to the results of the corrosion test for the steel. A conventional prediction method is limited to predicting the amount of corrosion at the point at which the corrosion test is performed. In the method for predicting the amount of corrosion according to the present invention, even if the test point Z in the corrosion test and the scheduled use point M of the steel are different points, it is possible to predict the future corrosion amount at the scheduled use point M with high accuracy based on the results of the corrosion test at the test point Z using the corrosion index $Q(t_{Xi}, W_X)$ found by the inventors.

Hereinafter, embodiments of the present invention will be described.

In the present embodiment, there is no particular limitation on the steel that can be used to predict the amount of corrosion, and a steel made of common steel (carbon steel), alloy steel, special steel or the like may be used. In addition, a plated steel obtained by plating these steels may also be used. The type of the plating is not particularly limited, and a plating that is generally used for steel may be used. In addition, the steel may be a steel made of stainless steel.

In addition, the steel according to the present embodiment is not limited to building materials, and can be suitably used for predicting the amount of corrosion in the steel used outdoors.

(System for Predicting Amount of Corrosion in Steel and Program for Predicting Amount of Corrosion in Steel)

First, the system for predicting the amount of corrosion and the program for predicting the amount of corrosion in a steel according to the present embodiment will be described.

As shown in FIG. 1, the system for predicting the amount of corrosion according to the present embodiment includes an extremal value estimation unit and a corrosion amount estimation unit. The extremal value estimation unit and the corrosion amount estimation unit are realized, for example, as functions provided in a central processing unit of an electronic computer.

The extremal value estimation unit has a function of obtaining a corrosion index $Q(t_{Mi}, W_M)$ of the steel for each past observation time $t_{Mi}$ based on the weather observation value $W_M$ at which the observation point X is a scheduled use point M of the steel, performing extremal value statistical analysis on time-series data of the corrosion index $Q(t_{Mi}, W_M)$ between observation times $t_{M1}$ to $t_{Mn}$, and thus estimating the maximal value $Q_{max}(t_{Fi})$ of the corrosion index within future evaluation periods $t_{F1}$ to $t_{Fn}$.

In addition, the corrosion amount estimation unit has a function of introducing the maximal value $Q_{max}(t_{Fi})$ of the corrosion index estimated by the extremal value estimation unit into the relational expression between the measured corrosion amount obtained in the corrosion test for the steel at the test point Z and the maximum value of the corrosion index $Q(t_{Zi}, W_Z)$ of the steel obtained for each observation time $t_{Zi}$ during the test period of the corrosion test based on the weather observation value $W_Z$ at which the observation point X is the test point Z to obtain an estimated value of the amount of corrosion in the steel during the estimated period. The above relational expression obtained in advance is introduced into the corrosion amount estimation unit.

Here, the above relational expression may be a relational expression between the measured corrosion amount obtained in the corrosion test for the steel and the logarithm of the maximum value of the corrosion index $Q(t_{Zi}, W_Z)$ of the steel.

In addition, the extremal value estimation unit and the corrosion amount estimation unit each may include a calculation unit for calculating corrosion indexes $Q(t_{Mi}, W_M)$ and $Q(t_{Zi}, W_Z)$.

The calculation unit may include a first processing unit that acquires at least a wind speed $u(t_{Xi})$, a wind direction $\theta w(t_{Xi})$ and the amount of rain for each observation time $t_{Xi}$ at an observation point X, a second processing unit that calculates a primary corrosion index $Q_1(t_{Xi}, W_X)$ for each observation time $t_{Xi}$, a third processing unit that calculates a secondary corrosion index $Q_2(t_{Xi}, W_X)$ for each observation time $t_{Xi}$, and a fourth processing unit that calculates a corrosion index $Q(t_{Xi}, W_X)$ for each observation time $t_{Xi}$.

Here, in the calculation unit when a corrosion index $Q(t_{Mi}, W_M)$ is obtained in the extremal value estimation unit, the point X is the scheduled use point M of the steel, $W_X$ is set to $W_M$, $t_{Xi}$ is set to $t_{Mi}$, $u(t_{Xi})$ is set to $u(t_{Mi})$, and $\theta w(t_{Xi})$ is set to $\theta w(t_{Mi})$. In addition, $c(t_{Xi})$ is set to $c(t_{Mi})$, $s(t_{Xi})$ is set to $s(t_{Mi})$, and $p(t_{Xi})$ is set to $p(t_{Mi})$.

In addition, in the calculation unit when a corrosion index $Q(t_{Zi}, W_Z)$ is obtained in the corrosion amount estimation unit, the point X is the test point Z of the steel, $W_X$ is set to $W_Z$, $t_{Xi}$ is set to $t_{Zi}$, $u(t_{Xi})$ is set to $u(t_{Zi})$, and $\theta w(t_{Xi})$ is set to $\theta w(t_{Zi})$. In addition, $c(t_{Xi})$ is set to $c(t_{Zi})$, $s(t_{Xi})$ is set to $s(t_{Zi})$, and $p(t_{Xi})$ is set to $p(t_{Zi})$.

In the system for predicting the amount of corrosion according to the present embodiment, the extremal value estimation unit and the corrosion amount estimation unit generate an estimated value of the amount of corrosion in the steel and output it.

Figure 2:
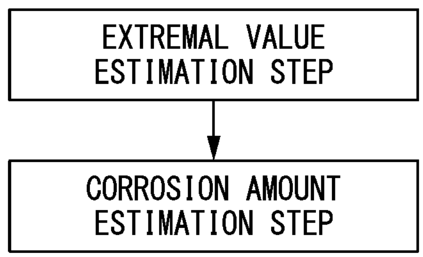
FIG. 2 is a schematic view illustrating a program for predicting the amount of corrosion in a steel according to an embodiment of the present invention.

Next, as shown in FIG. 2, the program for predicting the amount of corrosion according to the present embodiment includes an extremal value estimation step and a corrosion amount estimation step. The program for predicting the amount of corrosion according to the present embodiment is executed in an electronic computer. The electronic computer including the program for predicting the amount of corrosion sequentially executes the extremal value estimation step and the corrosion amount estimation step and thus outputs the estimated value of the amount of corrosion in the steel. In addition, the program for predicting the amount of corrosion can also be used as a program for the above system for predicting the amount of corrosion.

In the extremal value estimation step in the program for predicting the amount of corrosion, based on the weather observation value $W_M$ at which the observation point X is a scheduled use point M of the steel, a corrosion index $Q(t_{Mi}, W_M)$ of the steel is obtained for each past observation time $t_{Mi}$. Next, extremal value statistical analysis is performed on time-series data of the corrosion index $Q(t_{Mi}, W_M)$ between observation times $t_{M1}$ to $t_{Mn}$, and thus the maximal value $Q_{max}(t_{Fi})$ of the corrosion index within future evaluation periods $t_{F1}$ to $t_{Fn}$ is estimated. The extremal value estimation step may be performed in the extremal value estimation unit shown in FIG. 1.

In addition, in the corrosion amount estimation step in the program for predicting the amount of corrosion, the maximal value $Q_{max}(t_{Fi})$ of the corrosion index estimated in the extremal value estimation step is introduced into the relational expression between the measured corrosion amount obtained in the corrosion test for the steel at the test point Z and the maximum value of the corrosion index $Q(t_{Zi}, W_Z)$ of the steel obtained for each observation time $t_{Zi}$ during the test period of the corrosion test based on the weather observation value $W_Z$ at which the observation point X is the test point Z, and an estimated value of the amount of corrosion in the steel during the estimated period is obtained. Regarding the above relational expression, the relational expression described above is used. The above relational expression may be a relational expression between the measured corrosion amount obtained in the corrosion test for the steel and the logarithm of the maximum value of the corrosion index $Q(t_{Zi}, W_Z)$ of the steel. The corrosion amount estimation step may be performed in the corrosion amount estimation unit shown in FIG. 1.

In addition, the extremal value estimation step and the corrosion amount estimation step each may include a calculation step for calculating a corrosion index $Q(t_{Mi}, W_M)$, $Q(t_{Zi}, W_Z)$.

The calculation step may include a first step, a second step, a third step and a fourth step. In the first step, at least the wind speed $u(t_{Xi})$, the wind direction $\theta w(t_{Xi})$ and the amount of rain for each observation time $t_{Xi}$ at the observation point X are acquired. In the second step, a primary corrosion index $Q_1(t_{Xi}, W_X)$ is calculated for each observation time $t_{Xi}$. In the third step, a secondary corrosion index $Q_2(t_{Xi}, W_X)$ is calculated for each observation time $t_{Xi}$. In the fourth step, a corrosion index $Q(t_{Xi}, W_X)$ is calculated for each observation time $t_{Xi}$.

Here, in the calculation step when a corrosion index $Q(t_{Mi}, W_M)$ is obtained in the extremal value estimation step, the point X is the scheduled use point M of the steel, $W_X$ is set to $W_M$, $t_{Xi}$ is set to $t_{Mi}$, $u(t_{Xi})$ is set to $u(t_{Mi})$, and $\theta w(t_{Xi})$ is set to $\theta w(t_{Mi})$. In addition, $c(t_{Xi})$ is set to $c(t_{Mi})$, $s(t_{Xi})$ is set to $s(t_{Mi})$, and $p(t_{Xi})$ is set to $p(t_{Mi})$.

In addition, in the calculation step when a corrosion index $Q(t_{Zi}, W_Z)$ is obtained in the corrosion amount estimation step, the point X is the test point Z of the steel, $W_X$ is set to $W_Z$, $t_{Xi}$ is set to $t_{Zi}$, $u(t_{Xi})$ is set to $u(t_{Zi})$, and $\theta w(t_{Xi})$ is set to $\theta w(t_{Zi})$. In addition, $c(t_{Xi})$ is set to $c(t_{Zi})$, $s(t_{Xi})$ is set to $s(t_{Zi})$, and $p(t_{Xi})$ is set to $p(t_{Zi})$.

Details of the operations of the extremal value estimation unit, the corrosion amount estimation unit and the calculation unit of the system for predicting the amount of corrosion and the operations of the extremal value estimation step, the corrosion amount estimation step and the calculation step in the program for predicting the amount of corrosion according to the present embodiment will be described in the description of the method for predicting the amount of corrosion in a steel.

Here, in the system for predicting the amount of corrosion and the program for predicting the amount of corrosion according to the present embodiment, the input value includes at least the weather observation value $W_Z$ at the test point Z in the corrosion test, the weather observation value $W_M$ of the steel at the scheduled use point M, and the measured corrosion amount obtained in the corrosion test. In addition, the output value is a predicted value of the future corrosion amount when the steel is exposed to the outdoors at the scheduled use point M of the steel. As the amount of corrosion, the corrosion weight loss, the corrosion depth, or the RN value which is an appearance rating of corrosion (RN: rating number) can be used. As the method for evaluating an RN value, there is JIS G 0595: 2004 (method for evaluating the degree of surface rust occurrence of the stainless steel) for stainless steel.

(Method for Predicting Amount of Corrosion in Steel)

Next, a method for predicting the amount of corrosion in a steel according to the present embodiment will be described.

In the method for predicting the amount of corrosion in a steel according to the present embodiment, as an index for evaluating the amount of corrosion when the steel is exposed to the outdoors, the corrosion index $Q(t_{Xi}, W_X)$ of the steel obtained from the weather observation value $W_X$ including the wind speed, the wind direction and the amount of rain for each observation time $t_{Xi}$ (where i is an integer of 1 to n) at the observation point X is used.

The method for predicting the amount of corrosion in a steel according to the present embodiment includes an extremal value estimation step of estimating the maximal value $Q_{max}(t_{Fi})$ of the corrosion index and a corrosion amount estimation step of estimating the amount of corrosion in the steel after the estimated period has elapsed at the scheduled use point M.

In the extremal value estimation step of the prediction method, based on the weather observation value $W_M$ at which the observation point X is a scheduled use point M of the steel, a corrosion index $Q(t_{Mi}, W_M)$ of the steel is obtained for each past observation time $t_{Mi}$, extremal value statistical analysis is performed on time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated.

In the corrosion amount estimation step of the prediction method, the maximal value $Q_{max}(t_{Fi})$ of the corrosion index estimated in the extremal value estimation step is introduced into the relational expression between the measured corrosion amount of the steel and the maximum value of the corrosion index $Q(t_{Zi}, W_Z)$ of the steel, and the amount of corrosion in the steel after the estimated period has elapsed is estimated.

It is preferable to obtain the relational expression between the measured corrosion amount of the steel and the maximum value of the corrosion index $Q(t_{Zi}, W_Z)$ of the steel in advance. This relational expression is the relational expression between the measured corrosion amount obtained in the corrosion test for the steel at the test point Z and the maximum value of the corrosion index $Q(t_{Zi}, W_Z)$ of the steel obtained for each observation time $t_{Zi}$ during the test period of the corrosion test based on the weather observation value $W_Z$ at which the observation point X is the test point Z. The above relational expression may be a relational expression between the measured corrosion amount obtained in the corrosion test for the steel and the logarithm of the maximum value of the corrosion index $Q(t_{Zi}, W_Z)$ of the steel.

In addition, the extremal value estimation step and the corrosion amount estimation step each may include a calculation step for calculating a corrosion index $Q(t_{Mi}, W_M)$, $Q(t_{Zi}, W_Z)$.

First, when the method for evaluating the amount of corrosion in the steel according to the present embodiment is described, the corrosion index $Q(t_{Xi}, W_X)$ will be described.

In the method for predicting the amount of corrosion in a steel according to the present embodiment, as an index for evaluating the amount of corrosion when the steel is exposed to the outdoors, a corrosion index $Q(t_{Xi}, W_X)$ of the steel obtained from the weather data $W_X$ including a wind speed, a wind direction and the amount of rain for each observation time $t_{Xi}$ (where i is an integer of 1 to n) at the observation point X is used.

As described above, the inventors found weather conditions in which wind is observed and no rain occurs from nighttime to daytime as weather conditions in which corrosion of the steel is likely to occur. In these weather conditions, during the nighttime from sunset to sunrise, condensed water is generated on the surface of the steel, the salt moved by wind dissolves in the condensed water, the condensed water evaporates due to subsequent sunlight during the daytime, the salt is concentrated, and as a result, corrosion progresses. The salt is accumulated when there are many consecutive days without rain. On the other hand, when it rains, the salt disappears from the surface of the steel. The corrosion index $Q(t_{Xi}, W_X)$ according to the present embodiment is a value that serves as an index of the amount of a salt on the surface of the steel in such weather changes.

In addition, the corrosion accumulation coefficient $s(t_i)$ and the corrosion expression coefficient $p(t_{Xi})$ used for calculating the corrosion index $Q(t_{Xi}, W_X)$ will be described. $s(t_i)$ and $p(t_{Xi})$ are a value related to the wet state of the surface of the steel and are a value of 0 or 1. Whether the value is 0 or 1 depends on whether the observation time $t_{Xi}$ is daytime or nighttime.

That is, at nighttime, the surface of the steel becomes the wet state due to adhesion of condensed water. On the other hand, at daytime, condensed water adhered at nighttime is evaporated, and thus the surface of the steel is released from the wet state. Therefore, in the present embodiment, it is indirectly determined whether the surface of the steel is wet between daytime and nighttime, and the values of $s(t_i)$ and $p(t_{Xi})$ are determined based on the determination result.

Here, in the present embodiment, the period from sunset time to sunrise time is nighttime, and the period from sunrise time to sunset time is daytime.

When determining whether it is daytime or nighttime is obtained from the weather observation value $W_X$, the sunlight time between observation times $t_{Xi-1}$ to $t_{Xi}$ is acquired as the weather observation value $W_X$. If the observation time $t_{Xi}$ is nighttime, since there is no observation value of the sunlight time, it is possible to distinguish whether the observation time $t_{Xi}$ is daytime or nighttime depending on the presence of the observation value. Thereby, the corrosion accumulation coefficient $s(t_i)$ and the corrosion expression coefficient $p(t_{Xi})$ can be determined from the weather observation value $W_X$.

In addition, since the sunrise time and the sunset time can be calculated from the date (year, month, day) and the latitude, longitude and altitude of the point X, it is determined whether it is daytime or nighttime from the sunrise time and the sunset time obtained by calculation, and thereby the corrosion accumulation coefficient $s(t_i)$ and the corrosion expression coefficient $p(t_{Xi})$ may be determined.

Hereinafter, a method for calculating a corrosion index $Q(t_{Xi}, W_X)$ will be described. In the present embodiment, according to the calculation step including the following first step to fourth step, a primary corrosion index $Q_1(t_{Xi}, W_X)$ and a secondary corrosion index $Q_2(t_{Xi}, W_X)$ are sequentially obtained, and additionally, a corrosion index $Q(t_{Xi}, W_X)$ according to the present embodiment is obtained from the secondary corrosion index $Q_2(t_{Xi}, W_X)$.

Here, the subscript X in various parameter symbols used in the description of the present embodiment means the observation point X, and is scheduled to be replaced with M, which is an available point or Z, which is a test point. In addition, the notation of the observation time $t_{Xi}$ is a generalization of observation times $t_{X1}, t_{X2}, t_{X3}, \ldots t_{Xn}$, and an arbitrary observation time may be expressed as an observation time $t_{Xi}$. In addition, a set including observation times $t_{Xi}$ to $t_{Xn}$ as elements may be expressed as observation periods $t_{Xi}$ to $t_{Xn}$.

First, in the first step, at least the wind speed $u(t_{Xi})$, the wind direction $\theta w(t_{Xi})$ and the amount of rain for each observation time $t_{Xi}$ at the observation point X are acquired. In addition, the sunlight time may be acquired for each observation time $t_{Xi}$. The wind speed $u(t_{Xi})$, the wind direction $\theta w(t_{Xi})$, the amount of rain and the sunlight time at the observation point X may be collectively referred to as a weather observation value $W_X$.

The observation point X and the weather observation value $W_X$ in the first step may be appropriately selected according to the stage of the prediction method. That is, in the extremal value estimation step, the observation point X is a scheduled use point M of the steel, and the weather observation value $W_X$ is the weather observation value $W_M$ at the scheduled use point M. In addition, in the corrosion amount estimation step, the observation point X is the test point Z, and the weather observation value $W_X$ is the weather observation value $W_Z$ at the test point Z.

For the weather observation value $W_X$, for example, data measured at a weather observation station that a public weather observatory manages and published may be used. For example, in the case of Japan, data measured at a weather observation station that Japan Meteorological Agency manages and published may be used. That is, the weather observation value $W_X$ may be data measured at a weather observation station near the observation point X. In addition, the weather observation value $W_X$ is not limited to the value measured at a weather observation station that a public weather observatory manages, and measurement data measured at a temporary weather observation facility provided near the scheduled use point M of the steel or the test point Z may be used.

The length of the weather observation periods $t_{Xi}$ to $t_{Xn}$ at the observation point X is not particularly limited, and is preferably the period length to be described below.

The length of the past observation periods $t_{Mi}$ to $t_{Mn}$ at the scheduled use point M may be, for example, any period of 1 year or longer and 50 years or shorter, and is preferably 5 years or longer and 50 years or shorter, and more preferably 10 years or longer and 50 years or shorter. If the observation periods $t_{Mi}$ to $t_{Mn}$ are longer, a larger amount of data is included in the time-series data used during extremal value statistical analysis, and thus the reliability of extremal value statistical analysis is improved. Therefore, the observation periods $t_{Mi}$ to $t_{Mn}$ should preferably be as long as possible. In the prediction method according to the present embodiment, the future corrosion amount is predicted from the salt release state through extremal value statistical analysis, but the amount of a salt released varies from year to year, and for example, there are years in which a large amount of a sea salt is released and years in which a small amount of a sea salt is released. In addition, if the observation periods $t_{Mi}$ to $t_{Mn}$ are short, and include a year in which a large amount of a sea salt is released within that period, a predicted amount of corrosion in the future may be high. In order to prevent such a biased predicted value, the observation periods $t_{Mi}$ to $t_{Mn}$ should be long.

In addition, the length of the future evaluation periods $t_{F1}$ to $t_{Fn}$ at the use point M may be, for example, any period of 1 month or longer and 100 years or shorter, and preferably any period of 2 years or longer and 100 years or shorter.

In addition, in the corrosion amount estimation step, the length of the observation periods $t_{Zi}$ to $t_{Zn}$ at the test point Z may be, for example, any period of 1 day or longer and 30 years or shorter, preferably any period of 1 month or longer and 10 years or shorter, and may be 1 month or longer and 5 years or shorter.

The interval between the observation times $t_{X1}, \ldots t_{Xn}$ may be, for example, an observation time of 10 minutes, 15 minutes or 30 minutes. For the observation periods $t_{Zi}$ to $t_{Zn}$ at the test point Z, when the relational expression between the maximum value of the corrosion index $Q(t_{Zi}, W_Z)$ and the measured corrosion amount is obtained in the corrosion amount estimation step, the maximum value range of $Q(t_{Zi}, W_Z)$ may be a certain range. The maximum value of $Q(t_{Zi}, W_Z)$ may be converted to logarithm.

The wind speed $u(t_{Xi})$ may be an instantaneous wind speed (m/s) at the observation time $t_{Xi}$ or an average wind speed (m/s) between the observation times $t_{Xi-1}$ to $t_{Xi}$. The wind direction $\theta w(t_{Xi})$ is a direction in the wind direction at the observation time $t_{Xi}$ when the north direction is 0°. The amount of rain and the sunlight time at the observation time $t_{Xi}$ are the accumulated amount of rain from the observation time $t_{Xi-1}$ to the observation time $t_{Xi}$ and the accumulated time of sunlight. For example, if the observation time $t_{Xi}$ is every 10 minutes, the accumulated amount of rain and the accumulated time of sunlight for 10 minutes from the observation times $t_{Xi-1}$ to $t_{Xi}$ are used.

Next, in the second step, a primary corrosion index $Q_1(t_{Xi}, W_X)$ is calculated by the following Formula (1) for each observation time $t_{Xi}$.

$$Q_1(t_{Xi},W_X)=(d+1)^{-0.6}\{u(t_{Xi})\cdot\cos|\theta s-\theta w(t_{Xi})|\}^2 \quad (1)$$

In Formula (1), $u(t_{Xi})$ is a wind speed (m/s) at the observation time $t_{Xi}$, $\theta w(t_{Xi})$ is a wind direction (°) at the observation time $t_{Xi}$ when the north is 0°, and θs is a direction of the observation point X from the coast closest to the observation point X and is a direction (°) when the north is 0°.

In addition, in Formula (1), d is a distance (m) between the coast closest to the observation point X and the observation point X.

The primary corrosion index $Q_1(t_{Xi}, W_X)$ is an index of the amount of a salt adhered to the steel, and is calculated based on the wind speed $u(t_{Xi})$ and θs, $\theta w(t_{Xi})$. The term "$\cos|\theta s-\theta w(t_{Xi})|$" in Formula (1) is a coefficient for determining a wind speed component of wind blowing in from the coast within the wind speed $u(t_{Xi})$ at the observation point X. In addition, there is an empirical rule that the amount of a salt adhered to the steel is proportional to the square of the wind speed $u(t_{Xi})$. In addition, $(d+1)^{-0.6}$ is an attenuation coefficient considering that an airborne sea salt is reduced due to the distance d from the coast. Therefore, the primary corrosion index $Q_1(t_{Xi}, W_X)$, which is an index of the amount of a salt adhered to the steel, is as shown in Formula (1).

Next, in the third step, a secondary corrosion index $Q_2(t_{Xi}, W_X)$ is calculated by the following Formula (2) for each observation time $t_{Xi}$.

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \quad (2)$$

Provided that, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value. The threshold value can be obtained by performing a test in advance, and the amount of rain at which the salt adhered to the surface of the steel disappears can be experimentally determined. The threshold value may be determined, for example, within a range of 0 to 5 mm/hour.

In addition, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise).

For the method for determining a corrosion accumulation coefficient $s(t_{Xi})$, as described above, the coefficient may be determined based on weather data $W_X$ or may be determined based on the sunrise time and the sunset time calculated based on the longitude, the latitude, and the altitude of the point X.

In Formula (2), the primary corrosion index $Q_1(t_{Xi}, W_X)$ at the observation time $tX_i$ is added to the secondary corrosion index $Q_2(t_{Xi-1}, W_X)$ at the observation time $t_{Xi-1}$ which is an observation time immediately before the observation time $t_{Xi}$. In addition, the primary corrosion index $Q_1(t_{Xi}, W_X)$ is multiplied by the corrosion accumulation coefficients $s(t_i)$ and $(t_{Xi}-t_{Xi-1})$. Therefore, the polynomial of $Q_1(t_{Xi}, W_X)\cdot s(t_{Xi})\cdot(t_{Xi}-t_{Xi-1})$ forming a part of Formula (2) is 0 when the period between observation times $t_{Xi-1}$ to $t_{Xi}$ is daytime (the period from sunrise to sunset), and is a value of more than 0 when the period between observation times $t_{Xi-1}$ to $t_{Xi}$ is nighttime (the period from sunset to sunrise).

In addition, in Formula (2), the polynomial of $\{Q_2(t_{Xi-1}, W_X)+Q_1(t_{Xi}, W_X)\cdot s(t_{Xi})\cdot(t_{Xi}-t_{Xi-1})\}$ is multiplied by $c(t_{Xi})$. Therefore, $Q_2(t_{Xi}, W_X)$ is 0 when the amount of rain between observation times $t_{Xi-1}$ to $t_{Xi}$ exceeds the threshold value and is a value of more than 0 when the amount of rain between observation times $t_{Xi-1}$ to $t_{Xi}$ is equal to or less than the threshold value.

Therefore, the secondary corrosion index $Q_2(t_{Xi}, W_X)$ is an index of the amount of a salt accumulated due to generation of condensed water on the surface of the steel and dissolution of the salt moved by wind into the condensed water during the nighttime from sunset to sunrise.

Next, in the fourth step, a corrosion index $Q(t_{Xi}, W_X)$ is calculated by the following Formula (3A) for each observation time $t_{Xi}$.

$$Q(t_{Xi},W_X)=Q_2(t_{Xi},W_X)\cdot p(t_{Xi}) \quad (3A)$$

In Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset). For the method for determining a corrosion expression coefficient $p(t_{Xi})$, as described above, the coefficient may be determined based on weather data $W_X$ or may be determined based on the sunrise time and the sunset time calculated based on the longitude, the latitude, and the altitude of the point X.

In Formula (3A), $Q_2(t_{Xi}, W_X)$ is multiplied by $p(t_{Xi})$. Therefore, $Q(t_{Xi}, W_X)$ is 0 when the period between observation times $t_{Xi-1}$ to $t_{Xi}$ is nighttime (the period from sunset to sunrise) and is a value of more than 0 when the period between observation times $t_{Xi-1}$ to $t_{Xi}$ is daytime (the period from sunrise to sunset).

Therefore, the corrosion index $Q(t_{Xi}, W_X)$ is an index of the amount of a salt obtained when, during the nighttime from sunset to sunrise, condensed water is generated on the surface of the steel, the salt moved by wind dissolves in the condensed water, the condensed water evaporate due to subsequent sunlight during the daytime, and the salt is concentrated.

Generally, it can be said that, since the steel is more likely to corrode as the amount of a salt adhered is larger, the amount of corrosion in the steel tends to increase as the corrosion index $Q(t_{Xi}, W_X)$ is larger.

When the above calculation step is executed, the corrosion index $Q(t_{Xi}, W_X)$ is obtained for each time $t_{Xi}$.

In the calculation step in the extremal value estimation step, the point X is set to the scheduled use point M of the steel, $W_X$ is set to $W_M$, $t_{Xi}$ is set to $t_{Mi}$, $u(t_{Xi})$ is set to $u(t_{Mi})$, $\theta w(t_{Xi})$ is set to $\theta w(t_{Mi})$, $c(t_{Xi})$ is set to $c(t_{Mi})$, $s(t_{Xi})$ is set to $s(t_{Mi})$, and $p(t_{Xi})$ is set to $p(t_{Mi})$, and thus the corrosion index $Q(t_{Mi}, W_M)$ is obtained.

In the calculation step in the corrosion amount estimation step, the point X is the test point Z of the steel, $W_X$ is set to $W_Z$, $t_{Xi}$ is set to $t_{Zi}$, $u(t_{Xi})$ is set to $u(t_{Zi})$, $\theta w(t_{Xi})$ is set to $\theta w(t_{Zi})$, $c(t_{Xi})$ is set to $c(t_{Zi})$, $s(t_{Xi})$ is set to $s(t_{Zi})$, $p(t_{Xi})$ is set to $p(t_{Zi})$, and thus the corrosion index $Q(t_{Zi}, W_Z)$ is obtained.

Here, the calculation step may be executed by the extremal value estimation unit or the corrosion amount estimation unit of the above system for predicting the amount of corrosion. In addition, the first step to the fourth step may be executed by the first calculation unit to the fourth calculation unit provided in the extremal value estimation unit or the corrosion amount estimation unit, respectively.

Next, the extremal value estimation step and the corrosion amount estimation step in the prediction method according to the present embodiment will be described. Here, the extremal value estimation step and the corrosion amount estimation step may be executed in the extremal value estimation unit and the corrosion amount estimation unit of the above system for predicting the amount of corrosion.

(Extremal Value Estimation Step)

In the extremal value estimation step, first, based on the weather observation value $W_M$ at the scheduled use point M of the steel, a corrosion index $Q(t_{Mi}, W_M)$ of the steel is obtained for each past observation time $t_{Mi}$. Calculation of the corrosion index $Q(t_{Mi}, W_M)$ is performed according to the above calculation step.

Thereby, for each observation time $t_{M1}$, $t_{M2}$, . . . $t_{Mn}$ included in past periods $t_{M1}$ to $t_{Mn}$ at the scheduled use point M of the steel, corrosion indexes $Q(t_{M1}, W_M)$, $Q(t_{M2}, W_M)$, . . . $Q(t_{Mn}, W_M)$ are obtained. Thereby, time-series data of the corrosion index $Q(t_{Mi}, W_M)$ between observation times $t_{M1}$ to $t_{Mn}$ is obtained.

Figure 3:
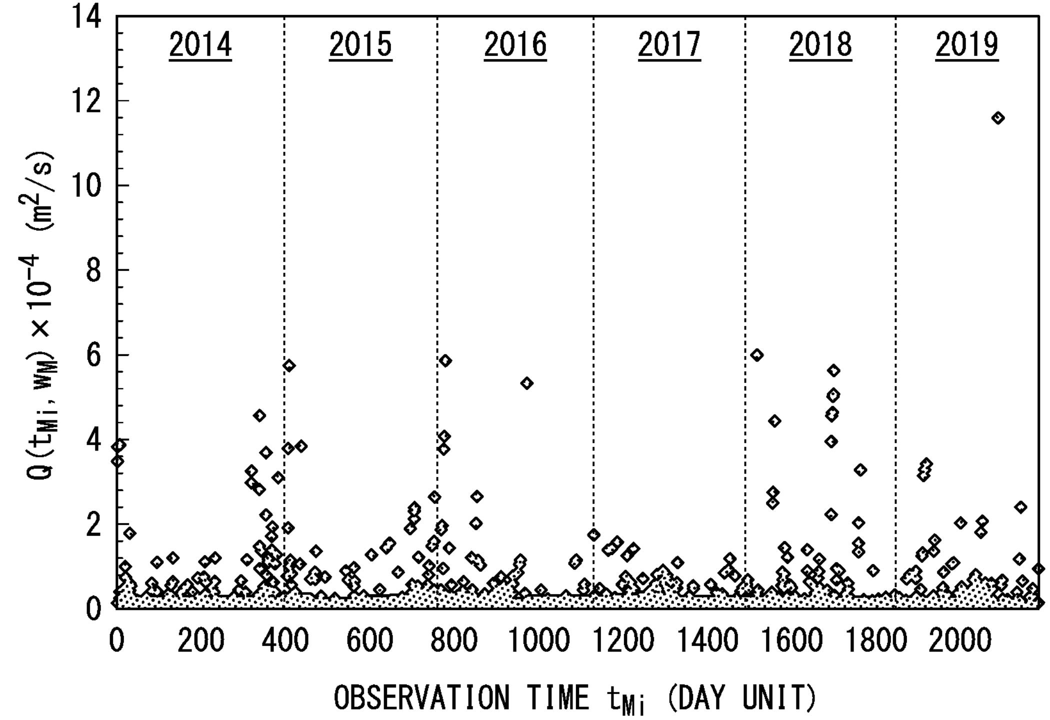
FIG. 3 is a graph showing an example of changes in a corrosion index $Q(t_{Mi}, W_M)$ over time.

FIG. 3 shows an example of a graph of time-series data of the corrosion index $Q(t_{Mi}, W_M)$ between observation times $t_{Ml}$ to $t_{Mi}$. FIG. 3 is a graph with the horizontal axis that represents the observation time $t_{Mi}$ and the vertical axis that represents the corrosion index $Q(t_{Mi}, W_M)$. Here, FIG. 3 is an example of time-series data of the corrosion index $Q(t_{Mi}, W_M)$ when the scheduled use point M is a point about 700 m away from the coast of the Setouchi region, Japan.

Next, in the extremal value estimation step, extremal value statistical analysis is performed on the previously obtained time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated.

Extremal value statistical analysis is a statistical method for estimating how likely a certain kind of large value is to appear from the given temporal and spatial data. That is, when extremal value statistical analysis is performed using the corrosion index $Q(t_{Mi}, W_M)$ between observation times $t_{M1}$ to $t_{Mn}$ as data, it is possible to estimate a level of the corrosion index $Q(t_{Mi}, W_M)$ in the future from the past weather observation value. Specifically, Gumbel distribution probability paper assuming that data in which the corrosion indexes $Q(t_{Mi}, W_M)$ are arranged in descending order is set and the data distribution follows the Gumbel distribution is prepared. Then, a maximal value $Q_{max}(t_{Fi})$ of the corrosion index within future evaluation periods $t_{F1}$ to $t_{Fn}$ is estimated using the Gumbel distribution probability paper.

Figure 4A:
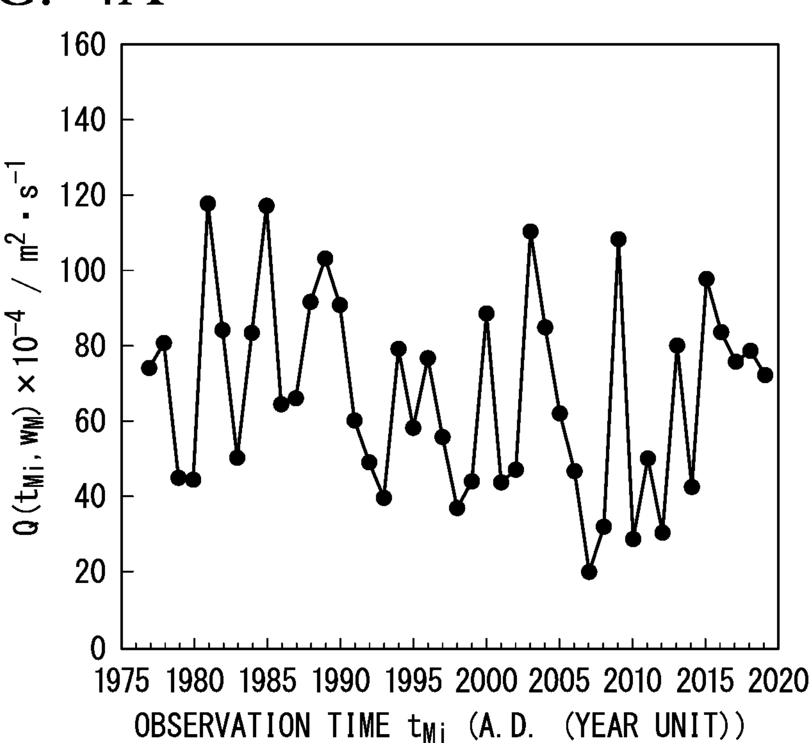
FIG. 4A is a graph showing an example of time-series data of a corrosion index $Q(t_{Mi}, W_M)$ between observation times $t_{M1}$ to $t_{Mn}$.
Figure 4B:
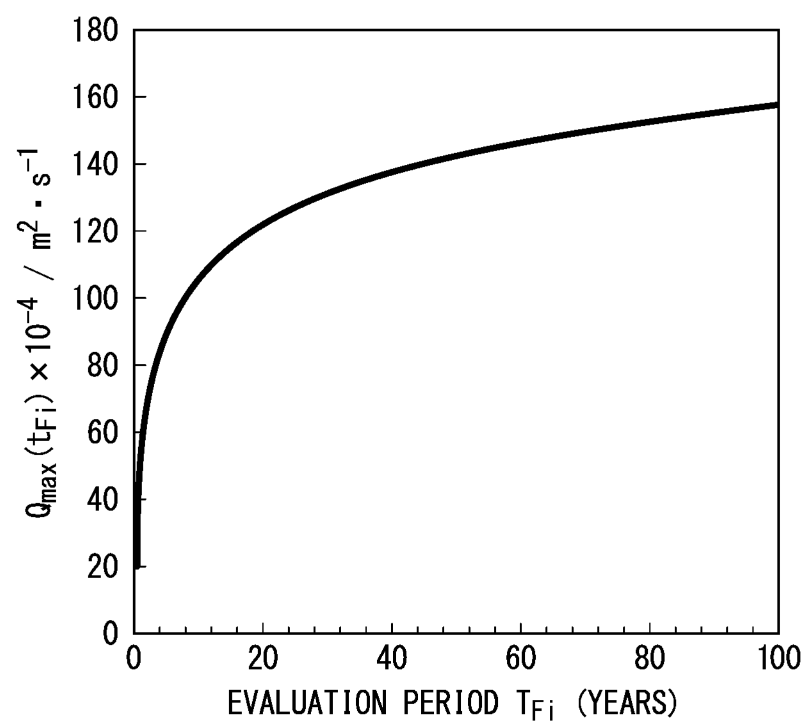
FIG. 4B is a graph showing a maximal value $Q_{max}(t_{Fi})$ of a corrosion index within future evaluation periods $t_{F1}$ to $t_{Fn}$.

FIG. 4A and FIG. 4B show an example of the analysis results of extremal value statistical analysis. When extremal value statistical analysis is performed, a graph of the maximal value of the corrosion index within future evaluation periods $t_{F1}$ to $t_{Fn}$ shown in FIG. 4B is obtained from the time-series data of the corrosion index $Q(t_{Mi}, W_M)$ between observation times $t_{M1}$ to $t_{Mn}$ shown in FIG. 4A. With reference to the graph in FIG. 4B, for example, it is possible to know the maximal value $Q_{max}(t_{Fi})$ of the corrosion index at the use point M after 10 years. Here, FIG. 4A and FIG. 4B are an example of the analysis results when the scheduled use point M is a point about 75 m away from the coast of Okinawa Prefecture, Japan.

(Corrosion Amount Estimation Step)

In the corrosion amount estimation step, the relational expression between the measured corrosion amount in the corrosion test results and the maximum value of the corrosion index $Q(t_{Zi}, W_Z)$ obtained in advance is used. Hereinafter, a procedure for deriving this relational expression will be described.

In order to obtain the relational expression, the measured corrosion amount obtained from the corrosion test for the steel at the test point Z and the corrosion index $Q(t_{Zi}, W_Z)$ of the steel obtained for each observation time $t_{Zi}$ during the test period of the corrosion test based on the weather observation value $W_Z$ at which the observation point X is the test point Z are obtained.

The measured corrosion amount of the steel is determined by actually placing the steel outdoors at the test point Z and observing the amount of corrosion. The amount of corrosion may be evaluated, for example, by the corrosion weight loss or pitting corrosion depth, or may be evaluated by RN.

Since the amount of corrosion in the steel varies depending on the steel type, a corrosion test may be performed on the same steel type as that of the steel to be used at the scheduled use point M.

In addition, the test point Z may be the same point as or a point different from the scheduled use point M of the steel. In addition, the test point Z may be one point or a plurality of points. In order to improve the prediction accuracy, preferably, the test point Z may be a plurality of points. That is, the test point Z may be one point $Z_\alpha$ or preferably a plurality of different points $Z_\alpha$, $Z_\beta$, $Z_\gamma$. . . When a plurality of test points Z are used, it is more preferable that the plurality of test points include points at different distances from the sea. In addition, it is more preferable that the plurality of test points include points with different weather conditions. When a plurality of test points are set in this manner, the range of the maximum value $Q_{Rmax}$ of the corrosion index $Q(t_{Zi}, W_Z)$ obtained in the corrosion test can be widened and the prediction accuracy can be improved. In addition, the test periods at the test points $Z_\alpha$, $Z_\beta$, $Z_\gamma$ . . . may be the periods with the same length or the periods with different lengths. In addition, observation times $t_{Z1}$, $t_{Z2}$, . . . $t_{Zn}$ included in the test period at the test points $Z_\alpha$, $Z_\beta$, $Z_\gamma$ . . . , specifically, $t_{Z\alpha 1}$ to $t_{Z\alpha n}$, $t_{Z\beta 1}$ to $t_{Z\beta n}$, $t_{Z\gamma 1}$ to $t_{Z\gamma n}$ and the like, may be the same time or different times.

In addition, regarding the corrosion index $Q(t_{Zi}, W_Z)$, based on the weather observation value $W_Z$ of the test periods $t_{Z1}$ to $t_{Zn}$ at the test point Z in the corrosion test, the corrosion index $Q(t_{Zi}, W_Z)$ of the steel is obtained for each observation time $t_{Zi}$. The corrosion index $Q(t_{Zi}, W_Z)$ is calculated in the above calculation step. Thereby, the corrosion indexes $Q(t_{Z1}, W_Z)$, $Q(t_{Z2}, W_Z)$, . . . $Q(t_{Zn}, W_Z)$ are obtained for each observation time $t_{Z1}$, $t_{Z2}$, . . . $t_{Zn}$ included in the test periods $t_{Z1}$ to $t_{Zn}$ at the test point Z.

When there are a plurality of test points Z, a corrosion index $Q(t_{Z1}, W_Z)$ is obtained for each test point. In this case, as the weather observation value $W_Z$, the weather observation value for each observation time $t_{Z1}$, $t_{Z2}$, . . . $t_{Zn}$ included in the test period at the test points $Z_\alpha$, $Z_\beta$, $Z_\gamma$ . . . , specifically, $t_{Z\alpha 1}$ to $t_{Z\alpha n}$, $t_{Z\beta 1}$ to $t_{Z\beta n}$, $t_{Z\gamma 1}$ to $t_{Z\gamma n}$ and the like, is used.

Figure 5:
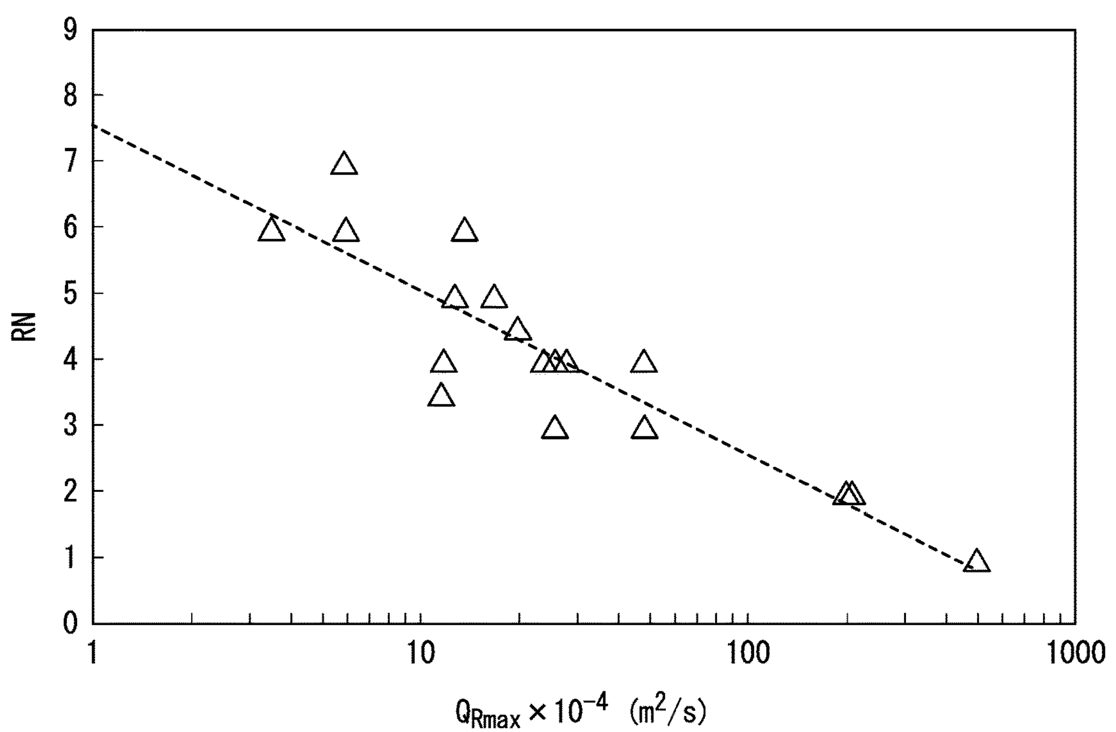
FIG. 5 is a graph showing the relationship between the logarithm of the maximal value $Q_{Rmax}$ and the measured corrosion amount (RN) for SUS304.

Next, for each corrosion test, the maximum value $Q_{Rmax}$ is extracted from the obtained corrosion indexes $Q(t_{Z1}, W_Z)$, $Q(t_{Z2}, W_Z)$, . . . $Q(t_{Zn}, W_Z)$, and the extracted maximum value $Q_{Rmax}$ is linked to the measured corrosion amount, which is the test result for each corrosion test. Then, a relational expression between the logarithm of the linked maximum value $Q_{Rmax}$ and the measured corrosion amount is obtained. FIG. 5 shows an example of a graph of plots of the logarithm of the maximum value $Q_{Rmax}$ and the measured corrosion amount (RN) for SUS304 and the relational expression. The dotted line in FIG. 5 is the line of the relational expression.

The relational expression may be a function expression of an approximation line obtained by approximating plots of the logarithm of the maximum value $Q_{Rmax}$ and the measured corrosion amount (RN) by a least-squares method or the like. For example, the relational expression may be a linear function expression of $Y=\alpha X+\beta$ with the logarithm of the maximum value $Q_{Rmax}$ as an independent variable X and the measured corrosion amount (RN) as a dependent variable Y. $\alpha$ and $\beta$ are constants. The accuracy of this relational expression can be improved by making the number of test points Z plural. Here, if the maximum value $Q_{Rmax}$ is not converted into a logarithm, the coefficient may be obtained by regression calculation or the like using another function expression that is easy to approximate, in place of the linear function expression of $Y=\alpha X+\beta$.

As shown in FIG. 5, in SUS304, RN decreases as the maximum value $Q_{Rmax}$ increases, and the appearance of the steel tends to deteriorate. Here, FIG. 5 is a graph showing the relationship between the logarithm of the maximum value $Q_{Rmax}$ and the measured corrosion amount when a plurality of points at a distance of 10 to 1,000 m away from the coast of the Setouchi region and Okinawa Prefecture, Japan are set as the test points Z.

Then, in the corrosion amount estimation step, the maximal value $Q_{max}(t_{Fi})$ of the corrosion index estimated in the extremal value estimation step is introduced into the relational expression between the logarithm of the maximum value $Q_{Rmax}$ and the measured corrosion amount obtained in advance. Thereby, it is possible to obtain an estimated value of the amount of corrosion in the steel at the future estimated period at the scheduled use point M.

Figure 6:
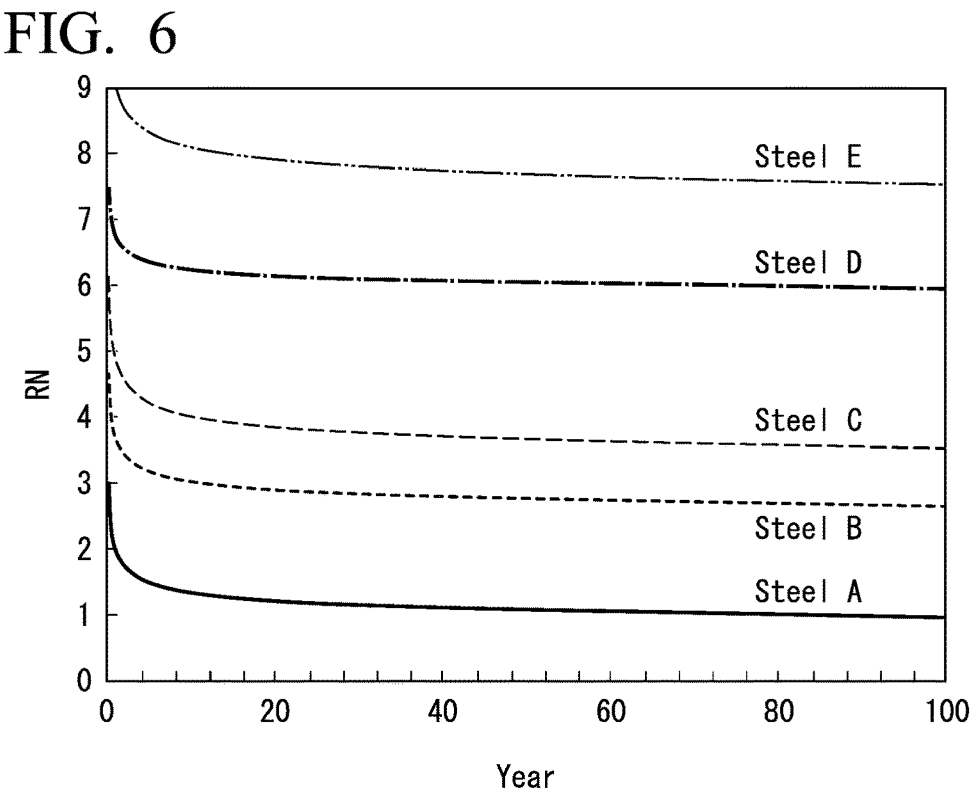
FIG. 6 is a graph showing an example of the output in the method for estimating the amount of corrosion according to the present embodiment.

FIG. 6 shows an example of the output of the estimation method according to the present embodiment. For example, for various types of steel (Steel A to Steel E), it is possible to know the estimated RN value one year to several decades ahead.

As described above, in the method for predicting the amount of corrosion in a steel, the system for predicting the amount of corrosion and the program for predicting the amount of corrosion according to the present embodiment, extremal value statistical analysis is performed on time-series data of the corrosion index $Q_M(t_{Mi}, W_M)$ for each past observation time $t_{Mi}$ at the scheduled use point M of the steel, and thus the maximal value $Q_{max}(t_{Fi})$ of the corrosion index within future evaluation periods $t_{F1}$ to $t_{Fn}$ is estimated. Next, the maximal value $Q_{max}(t_{Fi})$ of the corrosion index is introduced into the relational expression between the measured corrosion amount of the steel and the corrosion index $Q(t_{Zi}, W_Z)$ of the steel obtained in advance from the results of the corrosion test. In the present invention, since the amount of future corrosion of the steel is estimated in this manner, it is possible to improve the prediction accuracy of the corrosion amount compared to a conventional method for predicting the amount of corrosion based on the annual average value.

In addition, in the method for predicting the amount of corrosion in a steel, the system for predicting the amount of corrosion and the program for predicting the amount of corrosion according to the present embodiment, based on the results of the corrosion test for the steel at the test point Z, the future corrosion amount of the steel at the scheduled use point M is estimated. In the present embodiment, the correspondence relationship between the measured corrosion amount of the steel and the corrosion index $Q(t_{Zi}, W_Z)$ at the test point Z and time-series data of the corrosion index $Q(t_{Mi}, W_M)$ obtained from the weather observation value $W_M$ at the scheduled use point M may be obtained. Therefore, the present invention has excellent versatility.

In addition, according to the method for predicting the amount of corrosion in a steel, the system for predicting the amount of corrosion and the program for predicting the corrosion amount of the present embodiment, a primary corrosion index $Q_1(t_{Xi}, W_X)$ and a secondary corrosion index $Q_2(t_{Xi}, W_X)$ are sequentially obtained, and additionally, a corrosion index $Q(t_{Xi}, W_X)$ is obtained from the secondary corrosion index $Q_2(t_{Xi}, W_X)$. Here, the primary corrosion index $Q_1(t_{Xi}, W_X)$ is an index of the amount of a salt adhered to the steel, and calculated based on the wind speed $u(t_{Xi})$ and the wind direction Os, $\theta w(t_{Xi})$. In addition, the secondary corrosion index $Q_2(t_{Xi}, W_X)$ is calculated by adding the primary corrosion index $Q_1(t_{Xi}, W_X)$ at the observation time $t_{Xi}$ to the secondary corrosion index $Q_2(t_{Xi-1}, W_X)$ at the observation time $t_{Xi-1}$ which is an observation time immediately before the observation time $t_{Xi}$, additionally introducing the content of a salt, which is a main cause of corrosion, washed away by rain, as a corrosion extinction coefficient $c(t_{Xi})$, and introducing an increase in adhesion of a salt at nighttime when condensed water is likely to be generated on the surface of the steel as a corrosion accumulation coefficient $s(t_{Xi})$. Then, the corrosion index $Q(t_{Xi}, W_X)$ is calculated by quantifying a phenomenon in which corrosion progresses due to condensed water containing a salt adhered at nighttime that is dried by sunlight at daytime with a corrosion expression coefficient $p(t_{Xi})$, and multiplying the corrosion expression coefficient $p(t_{Xi})$ by the secondary corrosion index $Q_2(t_{Xi}, W_X)$. Thereby, it is possible to obtain the corrosion index $Q(t_{Xi}, W_X)$ that reflects weather conditions that influence the amount of a salt adhered to the steel, and by using this index, it is possible to improve the prediction accuracy of the corrosion amount.

Next, modification examples of the corrosion index $Q(t_{Xi}, W_X)$ in the method for predicting the amount of corrosion in a steel, the system for predicting the amount of corrosion and the program for predicting the amount of corrosion according to the present embodiment will be described. The first modification example is a modification example relating to temperature correction for the corrosion index $Q(t_{Xi}, W_X)$, and the second modification example is a modification example in which the corrosion index $Q(t_{Xi}, W_X)$ is corrected based on the determination result of the wet state of the surface of the steel. When these modification examples are used, it is possible to further improve the prediction accuracy of the corrosion amount.

First Modification Example

In the first modification example, in the fourth step in the method for predicting the amount of corrosion or the program for predicting the amount of corrosion or in the fourth processing unit of the system for predicting the amount of corrosion, a corrosion index $Q(t_{Xi}, W_X)$ is calculated for each observation time $t_{Xi}$ by the following Formula (3B) in place of Formula (3A).

$$Q(t_{Xi}, W_X)=10^{0.04\ Tb}\cdot Q_2(t_{Xi}, W_X)\cdot p(t_{Xi}) \quad (3B)$$

Provided that, in Formula (3B), Tb is any temperature in the range of Temp(° C.) to (Temp+2)° C. when the temperature at sunrise is Temp(° C.). Preferably, Tb may be a temperature Temp(° C.) at sunrise.

Corrosion of the steel is influenced by the temperature as well as the amount of a salt adhered to the surface of the steel. Therefore, when the temperature difference between the scheduled use point M of the steel at the observation point X and the test point Z increases, the prediction accuracy of the corrosion amount may decrease. Here, in order to improve the prediction accuracy of the corrosion amount, it is desirable to add a correction term for the temperature at the observation point X to the calculation formula of $Q(t_{Xi}, W_X)$.

As a result of examination by the inventors, it was found that the correction term is in the form of a power of 10 and the exponent is preferably a product of the temperature Tb(° C.) and the coefficient. Then, when a relational expression is obtained from the measured corrosion amount of the steel and the corrosion index $Q(t_{Zi}, W_Z)$ of the steel, if the index in the correction term is obtained by regression calculation, a value of 0.04 is obtained. Therefore, the exponent coefficient in the temperature correction term is 0.04.

The temperature Tb(° C.) included in the index of the temperature correction term is any temperature in the range of Temp(° C.) to (Temp+2)° C. when Temp is the temperature at sunrise. When the surface of the steel is wet, a salt dissolves in water on the surface, and after that, when water evaporates and the salt concentration increases, corrosion is likely to occur, and the temperature at which water evaporates influences the amount of corrosion. Such evaporation of water occurs during the temperature rise around sunrise. Therefore, the temperature Tb to be added to the correction term is any temperature in the range of Temp(° C.) to (Temp+2)° C. when Temp(° C.) is the temperature at sunrise. Preferably, the temperature Tb is the temperature Temp(° C.) at sunrise. The temperature Temp may be the temperature data included in the weather observation value $W_X$.

As described above, the temperature correction term to be incorporated into Formula (3B) is $10^{0.04\ Tb}$.

Figure 7:
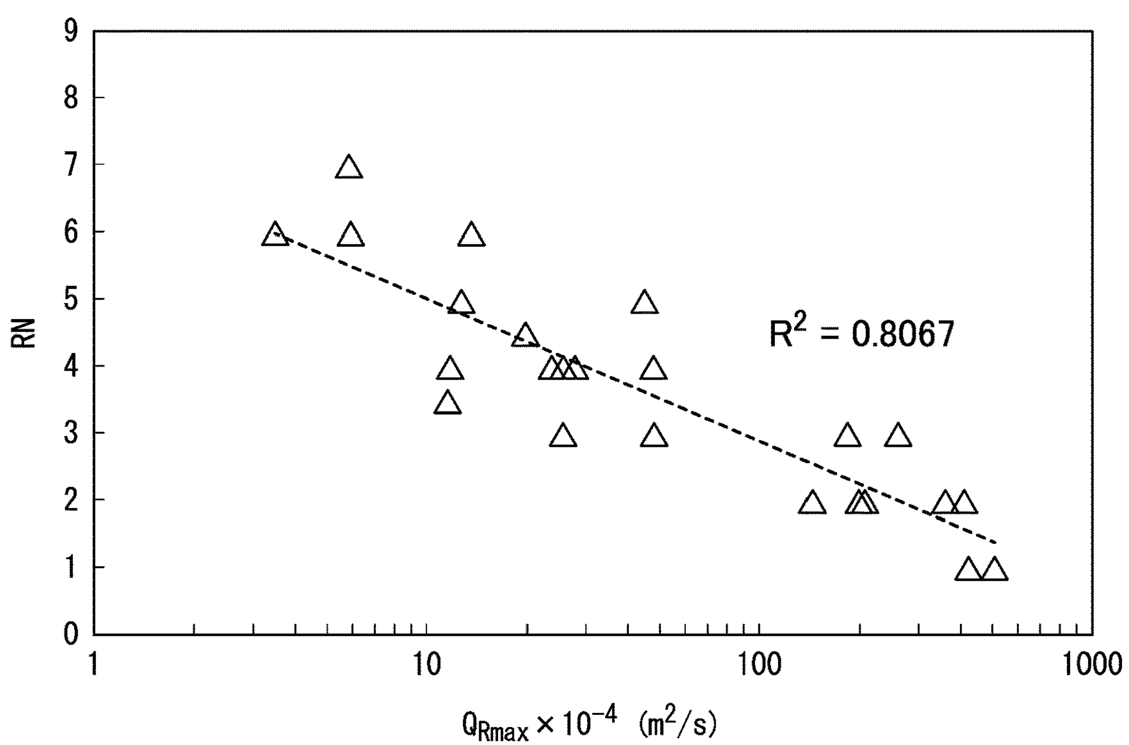
FIG. 7 is a graph showing the relationship between the logarithm of the maximal value $Q_{Rmax}$ and the measured corrosion amount (RN) for SUS304.
Figure 8:
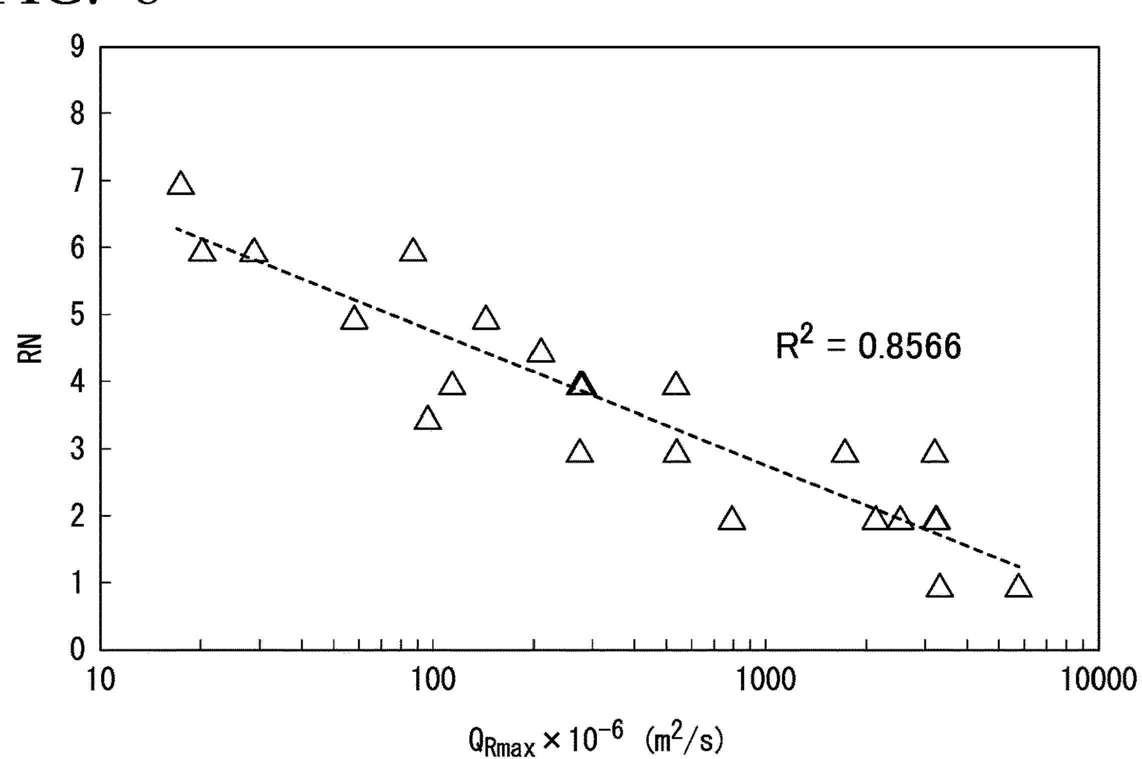
FIG. 8 is a graph showing the relationship between the logarithm of the maximal value $Q_{Rmax}$ after temperature correction and the measured corrosion amount (RN) for SUS304.

FIG. 7 is a graph showing the relationship between the logarithm of the maximum value $Q_{Rmax}$ and the measured corrosion amount (RN) for SUS304 and is a graph before temperature correction. In addition, FIG. 8 is a graph obtained by performing temperature correction on the graph in FIG. 7. Like FIG. 5, FIG. 7 and FIG. 8 are graphs showing the relationship between the logarithm of the maximum value $Q_{Rmax}$ and the measured corrosion amount when a plurality of points at a distance of 10 to 1,000 m away from the coast of the Setouchi region and Okinawa Prefecture, Japan are set as the test points Z, and in which new plots are added in addition to the plots shown in FIG. 5. The dotted lines in FIG. 7 and FIG. 8 are lines showing the relational expression between the logarithm of the maximum value $Q_{Rmax}$ and the measured corrosion amount (RN). The relational expression is a linear function expression of $Y=\alpha X+\beta$ with the logarithm of the maximum value $Q_{Rmax}$ as an independent variable X and the measured corrosion amount (RN) as a dependent variable Y. α and β are constants. Here, as in the description of FIG. 5, the maximum value $Q_{Rmax}$ does not necessarily have to be logarithmically converted.

In FIG. 7, the square value ($R^2$ value) of the correlation coefficient between the logarithm of the maximum value $Q_{Rmax}$ and the measured corrosion amount (RN) is about 0.81, and $R^2$ value in FIG. 8 is about 0.86. In FIG. 7, it can be understood that the $R^2$ value exceeds 0.80, and even when temperature correction is not performed, the reliability of the relational expression is sufficiently high, but the reliability of the relational expression is further improved by performing temperature correction. Therefore, when the maximum value $Q_{max}(t_{Fi})$ of the corrosion index estimated in the extremal value estimation step is introduced into the relational expression obtained by temperature correction, it is possible to obtain an estimated value of the amount of corrosion in the steel in the future estimated period at the scheduled use point M and to improve the reliability.

Second Modification Example

In the second modification example, $s(t_{Xi})$ in Formula (2) and $p(t_{Xi})$ in Formula (3A) are defined as follows and introduced into Formula (2) or Formula (3C), a secondary corrosion index $Q_2(t_{Xi}, W_X)$ is obtained by Formula (2), and additionally, a corrosion index $Q(t_{Xi}, W_X)$ is obtained by Formula (3C).

In Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0 and $s(t_{Xi})=1$ when $ws(t_{Xi})$ exceeds 0.

In Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

Here, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel. For the water adhesion amount $ws(t_{Xi})$, a value obtained by a calculation method to be described below is used. The wind speed (m/s) on the surface of the steel can be substituted with a wind speed value obtained from weather observation data.

The corrosion index $Q(t_{Xi}, W_X)$ according to the present invention is an index of the amount of a salt on the surface of the steel in consideration of weather changes. In the steel, condensed water is generated on the surface of the steel at nighttime, the salt dissolves in the condensed water, the condensed water containing a salt evaporates as the temperature rises during the daytime, and thus the salt concentrates on the surface of the steel sheet, and corrosion progresses. In this manner, corrosion of the steel is greatly influenced by the amount of water adhered to the surface of the steel. Therefore in the above embodiment, assuming that the amount of water on the surface of the steel increases at nighttime due to generation of condensed water and decreases due to evaporation of water during the daytime temperature rise, $s(t_{Xi})$ and $p(t_{Xi})$ are determined to be either 0 or 1 depending on whether the period between observation times $t_{Xi-1}$ to $t_{Xi}$ is daytime or nighttime.

On the other hand, in this modification example, the water adhesion amount $ws(t_{Xi})$ on the surface of the steel at the observation time $t_{Xi}$ is estimated, and $s(t_{Xi})$ and $p(t_{Xi})$ are determined to be either 0 or 1 according to the estimated $ws(t_{Xi})$. Thereby, it is possible to predict the amount of corrosion with higher accuracy compared with when the state of water on the surface of the steel is estimated depending on whether it is daytime or nighttime.

In addition, in the second modification example, in the fourth step of the method for predicting the amount of corrosion or the program for predicting the amount of corrosion or in the fourth processing unit of the system for predicting the amount of corrosion, a corrosion index $Q(t_{Xi}, W_X)$ is calculated by the following Formula (3C) in place of Formula (3A) for each observation time $t_{Xi}$.

$$Q(t_{Xi}, W_X)=10^{0.04\ Tc}\cdot Q_2(t_{Xi}, W_X)\cdot p(t_{Xi}) \quad (3C)$$

Provided that, in Formula (3C), Tc is the temperature (° C.) at a time before the observation time $t_{Xi}$ which is a time when the water adhesion amount $ws(t_{Xi})$ on the surface of the steel becomes 0.

Corrosion of the steel is influenced by the temperature as well as the amount of a salt adhered to the surface of the steel. Therefore, when the temperature difference between the scheduled use point M of the steel at the observation point X and the test point Z increases, the prediction accuracy of the corrosion amount may decrease. Here, in order to improve the prediction accuracy of the corrosion amount, it is desirable to add a correction term for the temperature at the observation point X to the calculation formula of $Q(t_{Xi}, W_X)$.

As a result of examination by the inventors, it was found that the correction term is in the form of a power of 10 and the exponent is preferably a product of the temperature Tc(° C.) and the coefficient. Then, when a relational expression is obtained from the measured corrosion amount of the steel and the corrosion index $Q(t_{Zi}, W_Z)$ of the steel, if the index in the correction term is obtained by regression calculation, a value of 0.04 is obtained. Therefore, the exponent coefficient in the temperature correction term is 0.04.

The temperature Tc(° C.) in the correction term is the temperature (° C.) at a time before the observation time $t_{Xi}$ and a time at which the water adhesion amount $ws(t_{Xi})$ on the surface of the steel becomes 0. When the surface of the steel is wet, a salt dissolves in water on the surface, and after that, when water evaporates and the salt concentration increases, corrosion is likely to occur, and the temperature at which water evaporates influences the amount of corrosion. Here, the temperature Tc to be added to the correction term is the temperature (° C.) at a time before the observation time $t_{Xi}$, which is a time at which the water adhesion amount $ws(t_{Xi})$ on the surface of the steel becomes 0. The temperature Tc may be temperature data included in the weather observation value $W_X$. In addition, for the water adhesion amount $ws(t_{Xi})$ on the surface of the steel, a value obtained by a calculation method to be described below is used.

In this modification example, the water adhesion amount $ws(t_{Xi})$ on the surface of the steel at the observation time $t_{Xi}$ is estimated, and the temperature Tc at which the water adhesion amount $ws(t_{Xi})$ becomes 0 is obtained. Then, $Q(t_{Xi}, W_X)$ is subjected to temperature correction using Tc. Thereby, it is possible to predict the amount of corrosion with higher accuracy compared with when the state of water on the surface of the steel is estimated depending on whether it is daytime or nighttime.

(Water Adhesion Amount $Ws(t_{Xi})$ on Surface of Steel)

Next, the water adhesion amount $ws(t_{Xi})$ on the surface of the steel used in the first modification example and the second modification example will be described. The water adhesion amount $ws(t_{Xi})$ is derived from the following Formula (A).

$$ws(t_{Xi})=(W_R+\Delta W-V_a)\cdot\Delta t \quad (A)$$

In Formula (A), $W_R$ is the amount of water (kg/m²/s) adhered to the surface of the steel due to rain, ΔW is a generation rate (kg/m²/s) of condensed water, $V_a$ is the amount of water evaporated (kg/m²/s), and Δt is $\Delta t=t_{Xi-1}-t_{Xi}$(s).

ΔW is derived from the following Formula (B).

$$\Delta W=\alpha'\cdot(VH-VHs) \quad (B)$$

α' is a moisture transfer rate (kg/m²/s) between the air surrounding the steel and the surface of the steel, VH is the absolute humidity (kg/kg) in air at the observation time $t_{Xi}$, and VHs is the surface saturated absolute humidity (kg/kg) determined by the temperature on the surface of the steel.

$V_a$ is derived from the following Formula (C).

$$V_a=Sh\cdot D\cdot(c_1-c_2)/L \quad (C)$$

Sh is the Sherwood number, which is derived from the Schmidt number Sc and the Reynolds number Re on the surface of the steel by the following Formula (C-1). D is a diffusion coefficient of water vapor, which is derived from the temperature T(° C.) and the barometric pressure p(hPa) at the observation time $t_{Xi}$ by the following Formula (C-2). $c_1$ is the saturated water vapor amount (kg/m³) at the temperature T(° C.) at the observation time $t_{Xi}$, $c_2$ is the water vapor amount (kg/m³) in air at the temperature T(° C.) at the observation time $t_{Xi}$, and L is the representative length. The Reynolds number Re is derived by the following Formula (C-3). ρ is the air density (kg/m³), v is the wind speed (m/s) on the surface of the steel, L is the characteristic length, and μ is the viscosity coefficient (Pa/s) of air.

$$Sh=0.332\cdot Re^{1/2}\cdot Sc^{1/3} \quad (C-1)$$

$$D=0.241\times10^{-4}\cdot\{(T+273.15)/288\}^{1.75}\cdot1013.25/(p\cdot t) \quad (C-2)$$

$$Re=\rho v^2/(\mu v/L) \quad (C-3)$$

When the corrosion index $Q(t_{Xi}, W_X)$ is obtained using the water adhesion amount $ws(t_{Xi})$ obtained in this manner, it is possible to predict the corrosion amount with higher accuracy.

Since the upper limit of the water adhesion amount $ws(t_{Xi})$ on the surface of the steel may vary depending on the surface state of the steel, an inclination angle of the surface when the steel is provided and the like, when the upper limit value is set, it may be appropriately set according to the type of the steel, the inclination state and the like.

Here, in the above first modification example and second modification example, it is described that the time is the time $t_{Xi}$ at the point X and the weather observation value is the weather observation value $W_X$ at the point X, but when the point X is the use point M of the steel, the time $t_{Xi}$ may be replaced with the observation time $t_{Mi}$ at the use point M, and the weather observation value $W_X$ may be replaced with the weather observation value $W_M$ at the use point M. In addition, when the point X is the test point Z, the time $t_{Xi}$ may be replaced with the time $t_{Zi}$ during the test period, and the weather observation value $W_X$ may be replaced with the weather observation value $W_Z$ at the test point Z.

Next, a method for proposing a steel according to the present embodiment will be described.

The method for proposing a steel according to the present embodiment includes a prediction process in which the amount of corrosion in the steel in the future at the scheduled use point M is predicted by the method for predicting the amount of corrosion in a steel described above and a process in which a salesperson presents the predicted value of the amount of corrosion obtained in the prediction process to a customer.

In addition, the method for proposing a steel according to the present embodiment includes a prediction process in which the amount of corrosion in the steel in the future at the scheduled use point M is predicted for each of a plurality of types of steels by the method for predicting the amount of corrosion in a steel described above, and a process in which a salesperson presents the predicted value of the amount of corrosion for each steel obtained in the prediction process to a customer.

The predicted value of the amount of corrosion may be, for example, a rating number. The rating number may be defined in JIS G 0595: 2004 (method for evaluating the degree of rust occurred on the surface of the stainless steel).

In the process of performing presenting to a customer, in place of presenting the predicted value of the amount of corrosion, or together with presenting the predicted value, an image of the surface of the steel corresponding to the predicted value of the amount of corrosion may be presented. Specifically, for example, an image of the surface of the steel corresponding to the predicted value of the amount of corrosion may be displayed on a display unit of a device for predicting the amount of corrosion in the steel or may be presented to the customer in the form of a document.

In addition, the predicted value of the amount of corrosion presented to a customer may be a rating number to at least one decimal place. Similarly, the image of the surface of the steel corresponding to the predicted value of the amount of corrosion may be an image corresponding to the rating number to at least one decimal place.

According to the method for predicting the amount of corrosion in a steel described above, for example, as shown in FIG. 6, for steels made of various types of steel, for example, it is possible to know the RN estimated value 50 years ahead. Therefore, according to the method for proposing a steel according to the present embodiment, when the amount of corrosion in the steel in the future at the scheduled use point M is predicted and a salesperson presents the obtained predicted value of the amount of corrosion to a customer, it is possible to meet the customer's demand to know the predicted value of the future corrosion amount when the steel is used in an outdoor environment for a long period of time. In addition, since it is possible to provide a highly accurate predicted value of the amount of corrosion, it is possible to recommend an appropriate steel to the customer.

In addition, according to the method for predicting the amount of corrosion in a steel described above, for example, as shown in FIG. 6, for a plurality of types of steels, for example, it is possible to know the estimated RN value for each steel type 50 years ahead. Therefore, according to the method for proposing a steel of the present embodiment, when the amount of corrosion in the steel in the future at the scheduled use point M is predicted for a plurality of types of steels, a salesperson presents the obtained predicted value of the amount of corrosion for each steel to a customer, and thus it is possible to provide a highly accurate predicted value of the amount of corrosion for each steel type, and it is possible to select an appropriate steel. Thereby, it is possible to recommend an appropriate steel to a customer.

In addition, when the image of the surface of the steel corresponding to the predicted value of the amount of corrosion is presented, a customer can intuitively understand the degree of corrosion. In addition, when a rating number to at least one decimal place or an image of the surface of the steel corresponding thereto is presented as the predicted value of the amount of corrosion, highly accurate prediction results can be shown.

INDUSTRIAL APPLICABILITY

The present invention can provide a method for predicting the amount of corrosion in a steel, a system for predicting the amount of corrosion in a steel and a program for predicting the amount of corrosion in a steel through which it is possible to improve the accuracy of predicting the amount of corrosion in a steel. In addition, the present invention can provide a method for proposing a steel using the amount of corrosion in a steel predicted by the method for predicting the amount of corrosion in a steel. These have industrial applicability.

What is claimed is:

1. A method for predicting an amount of corrosion in a steel using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the method comprising:

an extremal value estimation step in which, based on the weather observation value $W_M$ at which the observation point X is a scheduled use point M of the steel, a corrosion index $Q(t_{Mi}, W_M)$ of the steel is obtained for each past observation time $t_{Mi}$, extremal value statistical analysis is performed on time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated;

a corrosion amount estimation step in which a relational expression between a measured corrosion amount obtained in a corrosion test for the steel at a test point Z and a maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z is obtained in advance, the maximal value $Q_{max}(t_{Fi})$ of the corrosion index estimated in the extremal value estimation step is introduced into the relational expression, and an estimated value of the amount of corrosion in the steel during the evaluation periods is obtained; and a selecting step of selecting a recommended steel based on the estimated value of the amount of corrosion that was obtained.

2. The method for predicting the amount of corrosion in a steel according to claim 1, wherein the extremal value estimation step and the corrosion amount estimation step each include a calculation step of obtaining the corrosion index $Q(t_{Xi}, W_X)$, and wherein the calculation step includes:

a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3A) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=Q_2(t_{Xi}, W_X)\cdot p(t_{Xi}) \quad (3A)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

3. The method for predicting the amount of corrosion in a steel according to claim 1, wherein the extremal value estimation step and the corrosion amount estimation step each include a calculation step of obtaining the corrosion index $Q(t_{Xi}, W_X)$, and wherein the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3B) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=10^{0.04Tb}\cdot Q_2(t_{Xi}, W_X)\cdot p(t_{Xi}) \quad (3B)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

4. The method for predicting the amount of corrosion in a steel according to claim 1, wherein the extremal value estimation step and the corrosion amount estimation step each include a calculation step of obtaining the corrosion index $Q(t_{Xi}, W_X)$, and wherein the calculation step includes:

a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3C) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=10^{0.04Tc}\cdot Q_2(t_{Xi}, W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

5. The method for predicting the amount of corrosion in a steel according to any one of claims 1 to 4, wherein the steel is a steel made of stainless steel.

6. A method for proposing a steel, comprising:

a prediction process in which the amount of corrosion in the steel in the future at the scheduled use point M is predicted by the method for predicting the amount of corrosion in a steel according to any one of claims 1 to 4; and a process in which a salesperson presents an image of the surface of the steel corresponding to a predicted value of the amount of corrosion obtained in the prediction process or a predicted value of the amount of corrosion to a customer.

7. The method for proposing a steel according to claim 6, wherein the predicted value of the amount of corrosion is a rating number to at least one decimal place.

8. The method for proposing a steel according to claim 6, wherein the image of the surface of the steel corresponding to the predicted value of the amount of corrosion is an image corresponding to a rating number to at least one decimal place.

9. A method for proposing a steel, comprising:

a prediction process in which the amount of corrosion in the steel in the future at the scheduled use point M is predicted for each of a plurality of types of steels by the method for predicting the amount of corrosion in a steel according to any one of claims 1 to 4; and a process in which a salesperson presents an image of the surface of the steel corresponding to a predicted value of the amount of corrosion for each steel obtained in the prediction process or a predicted value of the amount of corrosion to a customer.

10. The method for proposing a steel according to claim 9, wherein the predicted value of the amount of corrosion is a rating number to at least one decimal place.

11. The method for proposing a steel according to claim 9, wherein the image of the surface of the steel corresponding to the predicted value of the amount of corrosion is an image corresponding to a rating number to at least one decimal place.

12. A system for predicting an amount of corrosion in a steel by an electronic computer using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the system comprising:

an extremal value estimation unit that, based on the weather observation value $W_M$ at which the observation point X is a scheduled use point M of the steel, obtains a corrosion index $Q(t_{Mi}, W_M)$ of the steel for each past observation time $t_{Mi}$, performs extremal value statistical analysis on time-series data of the corrosion index $Q(t_{Mi}, W_M)$ between observation times $t_{M1}$ to $t_{Mn}$, and thus estimates a maximal value $Q_{max}(t_{Fi})$ of the corrosion index within future evaluation periods $t_{F1}$ to $t_{Fn}$;

a corrosion amount estimation unit that obtains a relational expression between a measured corrosion amount obtained in a corrosion test for the steel at a test point Z and the maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z in advance, introduces the maximal value $Q_{max}(t_{Fi})$ of the corrosion index estimated by the extremal value estimation unit into the relational expression, and obtains an estimated value of the amount of corrosion in the steel during the evaluation periods; and the system selecting a recommended steel based on the estimated value of the amount of corrosion that was obtained.

13. The system for predicting the amount of corrosion in a steel according to claim 12, wherein the extremal value estimation unit and the corrosion amount estimation unit each include a calculation unit for obtaining the corrosion index $Q(t_{Xi}, W_X)$, and wherein the calculation unit includes a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3A) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \tag{1}$$

$$Q_2(t_{Xi},W_X)=\{Q_2(t_{Xi-1},W_X)+Q_1(t_{Xi},W_X)\cdot s(t_{Xi})\cdot(t_{Xi}-t_{Xi-1})\}\cdot c(t_{Xi}) \tag{2}$$

$$Q(t_{Xi},W_X)=Q_2(t_{Xi},W_X)\cdot p(t_{Xi}) \tag{3A}$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

14. The system for predicting the amount of corrosion in a steel according to claim 12, wherein the extremal value estimation unit and the corrosion amount estimation unit each include a calculation unit for obtaining the corrosion index $Q(t_{Xi}, W_X)$, and wherein the calculation unit includes:

a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3B) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=10^{0.04Tb}\cdot Q_2(t_{Xi}, W_X)\cdot p(t_{Xi}) \quad (3B)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

15. The system for predicting the amount of corrosion in a steel according to claim 12, wherein the extremal value estimation unit and the corrosion amount estimation unit each include a calculation unit for obtaining the corrosion index $Q(t_{Xi}, W_X)$, and wherein the calculation unit includes a first processing unit in which at least a wind speed $u(t_{Xi})$, a wind direction $\theta w(t_{Xi})$ and the amount of rain for each observation time $t_{Xi}$ at the observation point X are acquired, a second processing unit in which a primary corrosion index $Q_1(t_{Xi}, W_X)$ is calculated by the following Formula (1) for each observation time $t_{Xi}$, a third processing unit in which a secondary corrosion index $Q_2(t_{Xi}, W_X)$ is calculated by the following Formula (2) for each observation time $t_{Xi}$, and a fourth processing unit in which a corrosion index $Q(t_{Xi}, W_X)$ is calculated by the following Formula (3C) for each observation time $t_{Xi}$:

$$Q_1(t_{Xi}, W_X)=(d+1)^{-0.6}\{u(t_{Xi})\cdot\cos|\theta s-\theta w(t_{Xi})|\}^2 \quad (1)$$

$$Q_2(t_{Xi}, W_X)=\{Q_2(t_{Xi-1}, W_X)+Q_1(t_{Xi}, W_X)\cdot s(t_{Xi})\cdot(t_{Xi}-t_{Xi-1})\}\cdot c(t_{Xi}) \quad (2)$$

$$Q(t_{Xi}, W_X)=10^{0.04Tc}\cdot Q_2(t_{Xi}, W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

16. The system for predicting the amount of corrosion in a steel according to any one of claims 12 to 15, wherein the steel is a steel made of stainless steel.

17. A non-transitory computer readable medium, storing a set of instructions, executable by a computer, to perform a method for predicting the amount of corrosion in a steel used in an electronic computer, using, as an index for evaluating the amount of corrosion when the steel is exposed to the outdoors, a corrosion index $Q(t_{Xi}, W_X)$ of the steel obtained from a weather observation value $W_X$ including a wind speed, a wind direction and an amount of rain for each observation time $t_{Xi}$ (where i is an integer of 1 to n) at an observation point X, the method comprising:

an extremal value estimation step in which, based on the weather observation value $W_M$ at which the observation point X is a scheduled use point M of the steel, a corrosion index $Q(t_{Mi}, W_M)$ of the steel is obtained for each past observation time $t_{Mi}$, extremal value statistical analysis is performed on time-series data of the corrosion index $Q(t_{Mi}, W_M)$ between observation times $t_{M1}$ to $t_{Mn}$, and thus a maximal value $Q_{max}(t_{Fi})$ of the corrosion index within future evaluation periods $t_{F1}$ to $t_{Fn}$ is estimated;

a corrosion amount estimation step in which a relational expression between a measured corrosion amount obtained in a corrosion test for the steel at a test point Z and the maximum value of a corrosion index $Q(t_{Zi}, W_Z)$ of the steel obtained for each observation time $t_{Zi}$ during a test period of the corrosion test based on a weather observation value $W_Z$ at which the observation point X is the test point Z is obtained in advance, the maximal value $Q_{max}(t_{Fi})$ of the corrosion index estimated in the extremal value estimation step is introduced into the relational expression, and an estimated value of the amount of corrosion in the steel during the evaluation periods is obtained; and a selecting step of selecting a recommended steel based on the estimated value of the amount of corrosion that was obtained.

18. The non-transitory computer readable medium for predicting the amount of corrosion in a steel according to claim 17, wherein the extremal value estimation step and the corrosion amount estimation step each include a calculation step of obtaining the corrosion index $Q(t_{Xi}, W_X)$, and wherein the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3A) for each observation time $t_{Xi}$:

$$Q_1(t_{Xi}, W_X) = (d+1)^{-0.6}\{u(t_{Xi}) \cdot \cos|\theta s - \theta w(t_{Xi})|\}^2 \tag{1}$$

$$Q_2(t_{Xi}, W_X) = \{Q_2(t_{Xi-1}, W_X) + Q_1(t_{Xi}, W_X) \cdot s(t_{Xi}) \cdot (t_{Xi} - t_{XiS-1})\} \cdot c(t_{Xi}) \tag{2}$$

$$Q(t_{Xi}, W_X) = Q_2(t_{Xi}, W_X) \cdot p(t_{Xi}) \tag{3A}$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), and in Formula (3A), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

19. The non-transitory computer readable medium for predicting the amount of corrosion in a steel according to claim 17, wherein the extremal value estimation step and the corrosion amount estimation step each include a calculation step of obtaining the corrosion index $Q(t_{Xi}, W_X)$, and wherein the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3B) for each observation time $t_{Xi}$:

$$Q_1(t_{Xi}, W_X) = (d+1)^{-0.6}\{u(t_{Xi}) \cdot \cos|\theta s - \theta w(t_{Xi})|\}^2 \tag{1}$$

$$Q_2(t_{Xi}, W_X) = \{Q_2(t_{Xi-1}, W_X) + Q_1(t_{Xi}, W_X) \cdot s(t_{Xi}) \cdot (t_{Xi} - t_{XiS-1})\} \cdot c(t_{Xi}) \tag{2}$$

$$Q(t_{Xi}, W_X) = 10^{0.04Tb} \cdot Q_2(t_{Xi}, W_X) \cdot p(t_{Xi}) \tag{3B}$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when a period between observation times $t_{Xi-1}$ to $t_{Xi}$ is daytime (the period from sunrise to sunset), and $s(t_{Xi})=1$ when a period between observation times $t_{Xi-1}$ to $t_{Xi}$ is nighttime (the period from sunset to sunrise), in Formula (3B), Tb is any temperature in the range of Temp(° C.) to (Temp+2)° C. when the temperature at sunrise is Temp(° C.), and in Formula (3B), $p(t_{Xi})$ is a corrosion expression coefficient, and $p(t_{Xi})=0$ when a period between observation times $t_{Xi-1}$ to $t_{Xi}$ is nighttime (the period from sunset to sunrise) and $p(t_{Xi})=1$ when a period between observation times $t_{Xi-1}$ to $t_{Xi}$ is daytime (the period from sunrise to sunset).

20. The non-transitory computer readable medium for predicting the amount of corrosion in a steel according to claim 17, wherein the extremal value estimation step and the corrosion amount estimation step each include a calculation step of obtaining the corrosion index $Q(t_{Xi}, W_X)$, and wherein the calculation step includes a first step in which at least a wind speed $u(t_{Xi})$, a wind direction $\theta w(t_{Xi})$ and the amount of rain for each observation time $t_{Xi}$ at the observation point X are acquired, a second step in which a primary corrosion index $Q_1(t_{Xi}, W_X)$ is calculated by the following Formula (1) for each observation time $t_{Xi}$, a third step in which a secondary corrosion index $Q_2(t_{Xi}, W_X)$ is calculated by the following Formula (2) for each observation time $t_{Xi}$, and a fourth step in which a corrosion index $Q(t_{Xi}, W_X)$ is calculated by the following Formula (3C) for each observation time $t_{Xi}$:

$$Q_1(t_{Xi},W_X)=(d+1)^{-0.6}\{u(t_{Xi})\cdot\cos|\theta s-\theta w(t_{Xi})|\}^2 \quad (1)$$

$$Q_2(t_{Xi},W_X)=\{Q_2(t_{Xi-1},W_X)+Q_1(t_{Xi},W_X)\cdot s(t_{Xi})\cdot(t_{Xi}-t_{XiS-1})\}\cdot c(t_{Xi}) \quad (2)$$

$$Q(t_{Xi},W_X)=10^{0.04Tc}\cdot Q_2(t_{Xi},W_X)\cdot p(t_{Xi}) \quad (3C)$$

provided that, in Formula (1), d is the distance (m) between the coast closest to the observation point X and the observation point X, $u(t_{Xi})$ is a wind speed (m/s) at the observation time $t_{Xi}$, $\theta w(t_{Xi})$ is a wind direction (°) at the observation time $t_{Xi}$ when the north is 0°, and ↓s is a direction of the observation point X from the coast closest to the observation point X and is a direction (°) when the north is 0°, in Formula (2), $c(t_{Xi})$ is a corrosion extinction coefficient, and $c(t_{Xi})=0$ when the amount of rain between observation times $t_{Xi-1}$ to $t_{Xi}$ exceeds a threshold value, and $c(t_{Xi})=1$ when the amount of rain between observation times $t_{Xi-1}$ to $t_{Xi}$ is equal to or less than the threshold value, in Formula (2), $s(t_{Xi})$ is a corrosion accumulation coefficient, and $s(t_{Xi})=0$ when the water adhesion amount $ws(t_{Xi})$ on the surface of the steel at the observation time $t_{Xi}$ is 0, and $s(t_{Xi})=1$ when $ws(t_{Xi})$ exceeds 0, $ws(t_{Xi})$ is an estimated value obtained by subtracting the amount of water evaporated from the water adhesion amount due to rain and formation of condensation at the observation time $t_{Xi}$, and is a value determined from a surface temperature of the steel, the temperature (° C.), a barometric pressure (hPa), and a wind speed (m/s) and a relative humidity (%) on the surface of the steel, in Formula (3C), Tc is the temperature (° C.) at a time before the observation time $t_{Xi}$ which is a time when the water adhesion amount $ws(t_{Xi})$ on the surface of the steel becomes 0, and in Formula (3C), $p(t_{Xi})$ is a corrosion expression coefficient, and $p(t_{Xi})=0$ when $ws(t_{Xi})$ exceeds 0 and $p(t_{Xi})=1$ when $ws(t_{Xi})$ is 0 or less.

21. The non-transitory computer readable medium for predicting the amount of corrosion in a steel according to any one of claims 17 to 20, wherein the steel is a steel made of stainless steel.

* * * * *